US012755069B2

(12) United States Patent
Rai et al.

(10) Patent No.: US 12,755,069 B2
(45) Date of Patent: Oct. 6, 2026

(54) PERIODIC CELLULAR STRUCTURE BASED DESIGN FOR ADDITIVE MANUFACTURING APPROACH FOR LIGHT WEIGHTING AND OPTIMIZING STRONG FUNCTIONAL PARTS

(71) Applicant: The Research Foundation for The State University of New York, Amherst, NY (US)

(72) Inventors: Rahul Rai, East Amherst, NY (US); Jun Wang, Greenbelt, MD (US)

( * ) Notice: Subject to any disclaimer, the term of this patent is extended or adjusted under 35 U.S.C. 154(b) by 330 days.

(21) Appl. No.: 17/141,169

(22) Filed: Jan. 4, 2021

(65) Prior Publication Data

US 2021/0216683 A1 Jul. 15, 2021

Related U.S. Application Data

(60) Provisional application No. 62/957,112, filed on Jan. 3, 2020.

(51) Int. Cl.

| | |
|---|---|
| ***B33Y 50/00*** | (2015.01) |
| ***B29C 64/386*** | (2017.01) |
| ***B33Y 80/00*** | (2015.01) |
| ***G06F 30/23*** | (2020.01) |
| *G06F 111/08* | (2020.01) |
| *G06F 119/18* | (2020.01) |

(52) U.S. Cl.

CPC ............ *G06F 30/23* (2020.01); *B29C 64/386* (2017.08); *B33Y 50/00* (2014.12); *B33Y 80/00* (2014.12); *G06F 2111/08* (2020.01); *G06F 2119/18* (2020.01)

(58) Field of Classification Search

CPC ...... B22F 3/1115; B29C 64/386; B33Y 10/00; B33Y 50/00; B33Y 80/00; G06F 2111/08; G06F 2111/10; G06F 2119/14; G06F 2119/18; G06F 30/23

See application file for complete search history.

(56) References Cited

U.S. PATENT DOCUMENTS

2019/0138670 A1 * 5/2019 Bandara .................. G06F 30/20

FOREIGN PATENT DOCUMENTS

WO WO-2020055595 A1 * 3/2020 ............ G06F 30/00

OTHER PUBLICATIONS

Xin et al. "A surrogate modeling approach for additive-manufactured materials" from "International Journal for Multiscale Computational Engineering • Oct. 2017" (Year: 2017).*

* cited by examiner

*Primary Examiner* — Yuhui R Pan

(74) *Attorney, Agent, or Firm* — Hodgson Russ LLP

(57) ABSTRACT

A method of additively manufacturing a 3D structure, comprising defining a boundary conditions, load constraints, and a periodic cell structure for lattifying the 3D structure; providing a surrogate FE model predicting a relationship between the boundary conditions, load constraints, periodic cell structure, and 3D orientation angle of the periodic cell structure; optimizing lattification of the 3D structure, according to orientation angle, and a cost function while meeting the load constraints; and additively manufacturing the optimized 3D structure, optimized e.g., for mass and stress concentration under a pre-determined loading condition.

9 Claims, 28 Drawing Sheets
(25 of 28 Drawing Sheet(s) Filed in Color)

Optimum Uniform Offsetting

[−45°, −45°, 6.5365°]

Optimum Nonuniform Offsetting

[40.1433°, 32.6113°, −43.3873°]

Solid

Optimum Uniform Offsetting

[39.6360°, −7.3254°, −33.6042°]

Optimum Nonuniform Offsetting

[6.2853°, −41.8233°, −44.0704°]

Solid

Periodic surfaces in cubic phase

| Morphology | Periodic function | Model |
|---|---|---|
| $f_1$ | $\phi(\mathbf{p}) = cos\left(\frac{2\pi}{a}x\right) + cos\left(\frac{2\pi}{a}y\right) + cos\left(\frac{2\pi}{a}z\right) = 0$ | 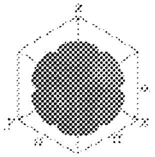 |
| $f_2^{3,II}$ | $\phi(\mathbf{p}) = cos\left[\frac{2\pi}{a}(x+y)\right] + cos\left[\frac{2\pi}{a}(x+z)\right] + cos\left[\frac{2\pi}{a}(y+z)\right] = 0$ | 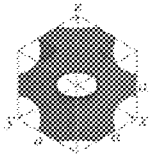 |
| $f_2^{4,II}$ | $\phi(\mathbf{p}) = cos\left[\frac{2\pi}{a}(x+y)\right] + cos\left[\frac{2\pi}{a}(x-y)\right] + cos\left[\frac{2\pi}{a}(x+z)\right] - cos\left[\frac{2\pi}{a}(x-z)\right] = 0$ | 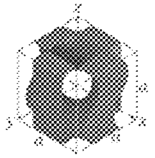 |
| $f_2^{3,IV}$ | $\phi(\mathbf{p}) = sin\left[\frac{2\pi}{a}(x-y)\right] + sin\left[\frac{2\pi}{a}(x+z)\right] + sin\left[\frac{2\pi}{a}(x-z)\right] - sin\left[\frac{2\pi}{a}(y+z)\right] - sin\left[\frac{2\pi}{a}(y-z)\right] = 0$ | 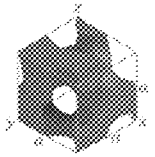 |
| $f_3^3$ | $\phi(\mathbf{p}) = cos\left[\frac{2\pi}{a}(x+y-z)\right] + cos\left[\frac{2\pi}{a}(x-y+z)\right] + cos\left[\frac{2\pi}{a}(x-y-z)\right] = 0$ | 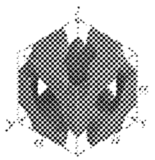 |
| $0.6f_3^{4,I} + 0.4f_5^{6,I}$ | $\phi(\mathbf{p}) = 0.6\left\{cos\left[\frac{2\pi}{a}(x+y+z)\right] + cos\left[\frac{2\pi}{a}(x+y-z)\right] + cos\left[\frac{2\pi}{a}(x-y+z)\right] + cos\left[\frac{2\pi}{a}(x-y-z)\right]\right\} + 0.4\left\{cos\left[\frac{2\pi}{a}(2x+2y)\right] + cos\left[\frac{2\pi}{a}(2x-2y)\right] + cos\left[\frac{2\pi}{a}(2x+2z)\right] + cos\left[\frac{2\pi}{a}(2x-2z)\right] + cos\left[\frac{2\pi}{a}(2y+2z)\right] + cos\left[\frac{2\pi}{a}(2y-2z)\right]\right\} = 0$ | 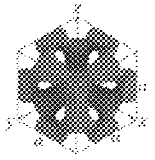 |

Fig. 21

PERIODIC CELLULAR STRUCTURE BASED DESIGN FOR ADDITIVE MANUFACTURING APPROACH FOR LIGHT WEIGHTING AND OPTIMIZING STRONG FUNCTIONAL PARTS

CROSS REFERENCE TO RELATED APPLICATIONS

The present application is a non-provisional of, and claims benefit of priority under 35 U.S.C. § 119(e), from U.S. Provisional Patent Application No. 62/957,112, filed Jan. 3, 2020, the entirety of which is expressly incorporated herein by reference.

FIELD OF THE DISCLOSURE

The present disclosure relates to additive manufacturing, and more particularly, three-dimensional (3D) printing of structural components.

BACKGROUND OF THE INVENTION

Each reference cited herein is expressly incorporated herein by reference in its entirety.

Nature is replete with fascinating examples of materials with intricate structures. Wegst and Ashby classified those natural materials into four groups: ceramics and ceramic composites, polymer and polymer composites, elastomers, and cellular materials. Among them, cellular materials are becoming of interest owing to the recent developments in cellular material design and additive manufacturing (AM). Cellular material design techniques efficiently mimic and model the complex cellular structures, and AM techniques allow structures of high complexity, such as lattice and foam structures, to be fabricated in short time-scales and with high accuracy. Additionally, since cellular solid is made up of an interconnected network of solid struts or plates that form the edges and faces of cells, the use of cellular structure enables a material to possess unique combinations of low weight, high stiffness and strength, and substantial energy absorption, which could be useful in a variety of application domains. See, en.wikipedia.org/wiki/3D_printing Irrespective of the strategy by which the material is categorized, all natural and man-made materials can be classified into two distinct groups: non-periodic and periodic materials. The structure of non-periodic material comprises elements forming a disordered arrangement, thus lacking organization or regularity in space. However, the structure of a periodic material is made of a basic object that repeats at precise intervals in space and the resulting structure possesses regularity. Accordingly, cellular materials with periodic structures can be defined as periodic cellular materials. In particular, the periodic cellular structure having a basic repeating object (unit cell) in cubic phase is called cubic periodic cellular structure (CPCS) (FIG. 2).

A material may also have long-range order or fractal characteristics. These may act as hybrids of periodic and non-periodic materials, depending on the respective property and scale being considered. Further, in some cases, the cellular structure may have a gradient or spectral property within the range of the structure formed with the material.

In an example of creating a CPCS part, an original geometry of the part is first provided and digitized into voxels. Then a unit cell can be generated by a surface defined by a continuous function is used to fill a surface representing an outer shell of the part. The surface may be a triply periodic minimal surface (TPMS) including Gyroid, P surface, D surface, and Lidinoid. The unit cell type can be selected by varying parameters of the unit cell including a unit cell period, and/or a unit cell orientation. Graded variants may also be provided. See, U.S. 2020/00391290. The lattice structure may be generated implicitly, by using a triply periodic minimal surface (TPMS) defined by a closed-form equation. One period of the TPMS forms the unit cell for the lattice structure. Various TPMS are Schoen's gyroid, Schwarz P and D surfaces, and Lidin's Lidinoid. These four TPMS are defined as follows:

Schoen's Gyroid:

$$\sin(x)\cos(y)+\sin(y)\cos(z)+\cos(z)\cos(x)=o$$

Schwarz P-Surface:

$$\cos(x)+\cos(y)+\cos(z)=0$$

Schwarz D-Surface:

$$\sin(x)\sin(y)\sin(z)+\sin(x)\sin(y)\cos(z)+\cos(x)\sin(y)\cos(z)+\cos(x)+\cos(y)\sin-(z)=0$$

Lidinoid:

$$1/2[\sin(2x)\cos(y)\sin(z)+\sin(2y)\cos(z)\sin(x)+\sin(2z)\cos(x)\sin(y)]-1/2[\cos-(2x)\cos(2y)+\cos(2y)\cos(2x)+\cos(2z)\cos(2x)]+0.15=0$$

A radial basis function (RBF) is a real-valued function φ whose value depends only on the distance between the input and some fixed point, either the origin, so that φ(x)=φ(||x||), or some other fixed point c, called a center, so that φ(x)=φ(||x−c||). Any function φ that satisfies the property φ(x)=φ(||x||) is a radial function. The distance is usually Euclidean distance, although other metrics are sometimes used. They are often used as a collection $\{\varphi_k\}_k$ which forms a basis for some function space of interest, hence the name. Sums of radial basis functions are typically used to approximate given functions. See, en.wikipedia.org/wiki/Radial_basis_function A radial function is a function φ:[0,∞)→□. When paired with a metric on a vector space ||·||:V→[0,∞) a function $\varphi_c$=φ(||x−c||) is said to be a radial kernel centered at c. A Radial function and the associated radial kernels are said to be radial basis functions if, for any set of nodes $$\{x_k\}_{k=1}^{n}.$$

The kernels $\varphi_{x_1}, \varphi_{x_2}, \ldots, \varphi_{x_n}$ are linearly independent. The kernels $\varphi_{x_1}, \varphi_{x_2}, \ldots, \varphi_{x_n}$ form a basis for a Haar Space, meaning that the interpolation matrix is non-singular:

$$\begin{bmatrix} \varphi(\|x_1-x_1\|) & \varphi(\|x_2-x_1\|) & \cdots & \varphi(\|x_n-x_1\|) \\ \varphi(\|x_1-x_2\|) & \varphi(\|x_2-x_2\|) & \cdots & \varphi(\|x_n-x_2\|) \\ \vdots & \vdots & \ddots & \vdots \\ \varphi(\|x_1-x_n\|) & \varphi(\|x_2-x_n\|) & \cdots & \varphi(\|x_n-x_n\|) \end{bmatrix}.$$

The maximum distortion criterion (also von Mises yield criterion) considers that yielding of a ductile material begins when the second invariant of deviatoric stress $J_2$ reaches a critical value. It is part of plasticity theory that applies best to ductile materials, such as some metals. Prior to yield, material response can be assumed to be of a nonlinear elastic, viscoelastic, or linear elastic behavior. In materials science and engineering the von Mises yield criterion can also be formulated in terms of the von Mises stress or equivalent tensile stress, $\sigma_V$. This is a scalar value of stress that can be computed from the Cauchy stress tensor. In this case, a material is said to start yielding when the von Mises stress reaches a value known as yield strength, $\sigma_Y$. The von Mises stress is used to predict yielding of materials under complex loading from the results of uniaxial tensile tests. The von Mises stress satisfies the property where two stress states with equal distortion energy have an equal von Mises stress. Because the von Mises yield criterion is independent of the first stress invariant, it is applicable for the analysis of plastic deformation for ductile materials such as metals, as onset of yield for these materials does not depend on the hydrostatic component of the stress tensor. See, en.wikipedia.org/wiki/Von_Mises_yield_criterion; www.simscale.com/blog/2017/04/von-mises-stress/; www.engineersedge.com/material_science/von_mises.htm.

The finite element method (FEM) is the most widely used method for solving problems of engineering and mathematical models. The FEM is a particular numerical method for solving partial differential equations in two or three space variables (i.e., some boundary value problems). To solve a problem, the FEM subdivides a large system into smaller, simpler parts that are called finite elements. This is achieved by a particular space discretization in the space dimensions, which is implemented by the construction of a mesh of the object: the numerical domain for the solution, which has a finite number of points. The finite element method formulation of a boundary value problem finally results in a system of algebraic equations. The method approximates the unknown function over the domain. The simple equations that model these finite elements are then assembled into a larger system of equations that models the entire problem. The FEM then uses variational methods from the calculus of variations to approximate a solution by minimizing an associated error function. Studying or analyzing a phenomenon with FEM is often referred to as finite element analysis (FEA). See, en.wikipedia.org/wiki/Finite_element_method; www.simscale.com/docs/simwiki/fea-finite-element-analysis/what-is-fea-finite-element-analysis/. See, U.S. Pub. Pat. App. Nos. 20200402222; 20200387896; 20200387652; 20200357116; 20200355944; 20200338639; 20200326639; 20200320175; 20200307174; 20200306860; 20200297499; 20200276783; 20200269509; 20200255881; 20200242765; 20200240139; 20200238628; 20200214598; 20200207024; 20200205988; 20200198230; 20200190272; 20200166909; 20200164435; 20200160947; 20200160497; 20200156323; 20200155323; 20200155276; 20200150623; 20200146775; 20200130256; 20200122140; 20200100871; 20200100866; 20200100865; 20200100864; 20200096970; 20200086624; 20200077896; 20200063242; 20200055301; 20200050119; 20200049648; 20200040113; 20200030065; 20200020165; 20200008023; 20190389134; 20190362716; 20190361917; 20190358515; 20190353265; 20190345276; 20190321135; 20190310419; 20190295254; 20190294754; 20190275746; 20190275737; 20190263060; 20190262101; 20190240724; 20190232592; 20190228777; 20190227525; 20190226597; 20190223797; 20190200184; 20190191284; 20190180291; 20190176450; 20190169846; 20190146457; 20190138670; 20190118486; 20190102880; 20190091946; 20190079492; 20190077095; 20190046322; 20190029522; 20190008674; 20180370145; 20180360609; 20180341248; 20180336723; 20180326291; 20180325525; 20180319150; 20180319087; 20180297291; 20180288586; 20180264347; 20180263782; 20180230588; 20180180812; 20180157243; 20180154533; 20180133583; 20180117447; 20180117446; 20180104912; 20180096175; 20180094953; 20180087443; 20180078843; 20180056595; 20180056594; 20180037703; 20180036970; 20180036939; 20180001183; 20170372480; 20170364058; 20170318360; 20170314118; 20170312614; 20170312578; 20170299969; 20170259555; 20170253354; 20170239064; 20170232517; 20170232300; 20170217095; 20170216915; 20170216036; 20170203547; 20170136699; 20170135802; 20170129185; 20170129184; 20170129052; 20170120535; 20170119531; 20170102089; 20170100214; 20170100209; 20170037674; 20170032281; 20170014169; 20170007367; 20170007366; 20160325520; 20160324581; 20160321384; 20160317312; 20160310282; 20160302496; 20160287395; 20160280403; 20160209820; 20160187166; 20160152358; 20160143744; 20160129645; 20160122043; 20160121548; 20160116222; 20160116218; 20150308935; 20150250597; 20150193559; 20150190971; 20150096266; 20150081029; 20150032215; 20140363481; 20140303942; 20140300017; 20140228860; 20140194996; 20140188240; 20140161520; 20140136154; 20140086780; 20140039631; 20130211531; 20130079693; 20120232671; 20120232670; 20120232669; 20120209394; 20120191420; 20120191205; 20110295378; 20110137578; 20110087332; 20110029093; 20100125356; 20050138885; and 20020152715.

A surrogate model is an engineering method used when an outcome of interest cannot be easily directly measured, so a model of the outcome is used instead. Most engineering design problems require experiments and/or simulations to evaluate design objective and constraint functions as a function of design variables. For many real-world problems, however, a single simulation can take many minutes, hours, or even days to complete. As a result, routine tasks such as design optimization, design space exploration, sensitivity analysis and what-if analysis become impossible since they require thousands or even millions of simulation evaluations. One way of alleviating this burden is by constructing approximation models, known as surrogate models, response surface models, metamodels or emulators, that mimic the behavior of the simulation model as closely as possible while being computationally cheaper to evaluate. Surrogate models are constructed using a data-driven, bottom-up approach. The exact, inner working of the simulation code is not assumed to be known (or even understood), and solely the input-output behavior is important. A model is constructed based on modeling the response of the simulator to a limited number of intelligently chosen data points. This approach is also known as behavioral modeling or black-box modeling, though the terminology is not always consistent. See, en.wikipedia.org/wiki/Surrogate_model, www.nature.com/articles/s41524-019-0189-9, link.springer.com/article/10.1007/s11590-019-01428-7. See also, 20200401748; 20200371504; 20200284137; 20200218839; 20200218232; 20200202059; 20200202052; 20200198230; 20200189183; 20200158004; 20200065447; 20200042659; 20190197199; 20190195292; 20190155976; 20190038249; 20180254109; 20180247020; 20180168731; 20180153495; 20180028338; 20170372196; 20170293705; 20170169142; 20170129254; 20170124448; 20170004278; 20160187230; 20160179992; 20160148372; 20160148371; 20160113791; 20160004792; 20150269283; 20150242589; 20150226878; 20150226654; 20150226049; 20150193559; 20150190971; 20140358500; 20140052230; 20130197881; 20130144369; 20130118736; 20130096900; 20130096899; 20130096898; 20130073272; 20120283861; 20120046776; 20110153282; 20110024125; 20110011595; 20100262227; 20080228680; 20080059132; 20070043622; and 20060191544.

In mathematics, the $L^p$ spaces are function spaces defined using a natural generalization of the p-norm for finite-dimensional vector spaces. They are sometimes called Lebesgue spaces. $L^p$ spaces form an important class of Banach spaces in functional analysis, and of topological vector spaces. See, en.wikipedia.org/wiki/Lp_space.

In statistics, measures of central tendency and statistical dispersion, such as the mean, median, and standard deviation, are defined in terms of $L^p$ metrics, and measures of central tendency can be characterized as solutions to variational problems. In penalized regression, "$L^1$ penalty" and "$L^2$ penalty" refer to penalizing either the $L^1$ norm of a solution's vector of parameter values (i.e., the sum of its absolute values), or its $L^2$ norm (its Euclidean length).

The Fourier transform for the real line (or, for periodic functions, see Fourier series), maps $L^p(R)$ to $L^q(R)$ (or $L^p(T)$ to $\ell^p$) respectively, where $1 \le p \le 2$ and $1/p+1/q=1$. By contrast, if $p>2$, the Fourier transform does not map into $L^q$.

The length of a vector $x=(x_1, x_2, \ldots, x_n)$ in the n-dimensional real vector space $R^n$ is usually given by the Euclidean norm: $\|x\|_2=(x_1^2+x_2^2+\ldots+x_n^2)^{1/2}$.

The Euclidean distance between two points x and y is the length $\|x-y\|^2$ of the straight line between the two points. In many situations, the Euclidean distance is insufficient for capturing the actual distances in a given space. For a real number $p \ge 1$, the p-norm or $L^p$-norm of x is defined by $\|x\|_p=(|x_1|^p+|x^2|^p+\ldots+|x_n|^p)^{1/p}$. The absolute value bars are unnecessary when p is a rational number and, in reduced form, has an even numerator. The Euclidean norm from above falls into this class and is the 2-norm, and the 1-norm is the norm that corresponds to the rectilinear distance. The $L^\infty$-norm or maximum norm (or uniform norm) is the limit of the $L^p$-norms for $p \to \infty$. The limit is equivalent to the following definition:

$$\|x\|_\infty = \max\{|x_1|, |x_2|, \ldots, |x_n|\}$$

For all $p \ge 1$, the p-norms and maximum norm satisfy the properties of a "length function" (or norm), which are that: only the zero vector has zero length, the length of the vector is positive homogeneous with respect to multiplication by a scalar (positive homogeneity), and the length of the sum of two vectors is no larger than the sum of lengths of the vectors (triangle inequality). The grid distance or rectilinear distance (sometimes called the "Manhattan distance") between two points is never shorter than the length of the line segment between them (the Euclidean or "as the crow flies" distance). Formally, this means that the Euclidean norm of any vector is bounded by its 1-norm $\|x\|_2 \le \|x\|_1$. This fact generalizes top-norms in that the p-norm $\|x\|_p$ of any given vector x does not grow with p: $\|x\|_{p+a} \le \|x\|p$ for any vector x and real numbers $p \ge 1$ and $a \ge 0$. This remains true for $0<p<1$ and $a \ge 0$. For the opposite direction, the following relation between the 1-norm and the 2-norm is known: $\|x\|_1 \le \sqrt{n}\|x\|_2$. This inequality depends on the dimension n of the underlying vector space and follows directly from the Cauchy-Schwarz inequality. In general, for vectors in Cn where $0<r<p$: $\|x\|_p \le \|x\|_r \le n^{(1/r-1/p)}\|x\|_p$. This is a consequence of Hölder's inequality.

In $R^n$ for $n>1$, the formula $\|x\|_p=(|x_1|^p+|x^2|^p+\ldots+|x_n|^p)^{1/p}$ defines an absolutely homogeneous function for $0<p<1$; however, the resulting function does not define a norm, because it is not subadditive. On the other hand, the formula $|x_1|^p+|x^2|^p+\ldots+|x_n|^p$ defines a subadditive function at the cost of losing absolute homogeneity. It does define an F-norm, though, which is homogeneous of degree p. Hence, the function $$d_p(x, y) = \sum_{i=1}^{n} |x_i - y_i|^p$$

defines a metric. The metric space $(R^n, d^p)$ is denoted by $\ell_n^p$.

Although the p-unit ball $B_n^p$ around the origin in this metric is "concave", the topology defined on $R^n$ by the metric $d_p$ is the usual vector space topology of $R^n$, hence $\ell_n^p$ is a locally convex topological vector space. Beyond this qualitative statement, a quantitative way to measure the lack of convexity of $\ell_n^p$ is to denote by $C_p(n)$ the smallest constant C such that the multiple C $B_n^p$ of the p-unit ball contains the convex hull of $B_n^p$, equal to $B_n^1$. The fact that for fixed $p<1$ we have $C_p(n)=n^{1/p-1} \to \infty$, as $n \to \infty$, shows that the infinite-dimensional sequence space $\ell^p$ defined below, is no longer locally convex.

One can define the space $\ell^p$ over a general index set I (and $1 \le p \le \infty$) as $$\ell^p(I) = \left\{(x_i)_{i \in I} \in K^I;\ \sum_{i \in I} |x_i|^p < \infty\right\},$$

where convergence on the right means that only countably many summands are nonzero (see also Unconditional convergence). With the norm $$\|x\|_p = \left(\sum_{i \in I} |x_i|^p\right)^{1/p}$$

the space $\ell^p(I)$ becomes a Banach space. In the case where I is finite with n elements, this construction yields $R^n$ with the p-norm defined above. If I is countably infinite, this is exactly the sequence space $\ell^p$ defined above. For uncountable sets I this is a non-separable Banach space which can be seen as the locally convex direct limit of $\ell^p$-sequence spaces.

An $L^p$ space may be defined as a space of measurable functions for which the p-th power of the absolute value is Lebesgue integrable, where functions which agree almost everywhere are identified. More generally, let $1 \le p < \infty$ and $(S, \Sigma, \mu)$ be a measure space. Consider the set of all measurable functions from S to C or R whose absolute value raised to the $p^{th}$ power has a finite integral, or equivalently, that $$\|f\|_p \equiv \left(\int_S |f|^p d\mu\right)^{1/p} < \infty$$

The set of such functions forms a vector space, with the following natural operations: $(f+g)(x)=f(x)+g(x)$, $(\lambda f)(x)=\lambda f(x)$ for every scalar $\lambda$. That the sum of two $p^{th}$ power integrable functions is again $p^{th}$ power integrable follows from the inequality $$\|f + g\|_p^p \le 2^{p-1}\left(\|f\|_p^p + \|g\|_p^p\right).$$

(This comes from the convexity of $t \mapsto t^p$ for $p \geq 0$.) In fact, more is true. Minkowski's inequality says the triangle inequality holds for $\|\cdot\|_p$. Thus the set of $p^{th}$ power integrable functions, together with the function $\|\cdot\|_p$, is a semi-normed vector space, which is denoted by $L^p(S,\mu)$. For $p=\infty$, the space $L^p(S,\mu)$ is the space of measurable functions bounded almost everywhere, with the essential supremum of its absolute value as a norm: $\|f\|_\infty \equiv \inf\{C \geq 0: |f(x)| \leq C$ for almost every $x\}$.

As in the discrete case, if there exists $q<\infty$ such that $f \in L^\infty(S,\mu) \cap L^q(S,\mu)$, then $$\|f\|_\infty = \lim_{p\to\infty} \|f\|_p.$$

$L^p(S,\mu)$ can be made into a normed vector space in a standard way; one simply takes the quotient space with respect to the kernel of $\|\cdot\|_p$. Since for any measurable function $f$, we have that $\|f\|_p=0$ if and only if $f=0$ almost everywhere, the kernel of $\|\cdot\|_p$ does not depend upon p, $$N \equiv \{f: f = 0 \ \mu\text{-almost everywhere}\} = ker(\|\cdot\|_p) \ \forall \ 1 \leq p < \infty$$

In the quotient space, two functions $f$ and g are identified if $f=g$ almost everywhere. The resulting normed vector space is, by definition, $L^p(S,\mu)=L^p(S,\mu)/N$. In general, this process cannot be reversed: there is no consistent way to recover a coset of N from $L^p$. For $L^\infty$, however, there is a theory of lifts enabling such recovery. When the underlying measure space S is understood, $L^p(S,\mu)$ is often abbreviated $L^p(\mu)$, or just $L^p$. For $1 \leq p \leq \infty$, $L^p(S,\mu)$ is a Banach space. The fact that $L^p$ is complete is often referred to as the Riesz-Fischer theorem.

The Minkowski distance or Minkowski metric is a metric in a normed vector space which can be considered as a generalization of both the Euclidean distance and the Manhattan distance. See, en.wikipedia.org/wiki/Minkowski_distance. The Minkowski distance of order p (where p is an integer) between two points $X=(x_1, x_2, \ldots, x_n)$ and $Y=(y_1, y_2, \ldots, y_n) \in \square^n$ is defined as:

$$D(X, Y) = \left(\sum_{i=1}^{n} |x_i - y_i|^p\right)^{\frac{1}{p}}$$

For $p \geq 1$, the Minkowski distance is a metric as a result of the Minkowski inequality. When $p<1$, the distance between (0,0) and (1,1) is $2^{1/p}>2$, but the point (0,1) is at a distance 1 from both of these points. Since this violates the triangle inequality, for $p<1$ it is not a metric. However, a metric can be obtained for these values by simply removing the exponent of 1/p. The resulting metric is also an F-norm.

Minkowski distance is typically used with p being 1 or 2, which correspond to the Manhattan distance and the Euclidean distance, respectively. In the limiting case of p reaching infinity, we obtain the Chebyshev distance:

$$\lim_{p\to\infty} \left(\sum_{i=1}^{n} |x_i - y_i|^p\right)^{\frac{1}{p}} = \max_{i=1}^{n} |x_i - y_i|.$$

Similarly, for p reaching negative infinity, we have:

$$\lim_{p\to\infty} \left(\sum_{i=1}^{n} |x_i - y_i|^p\right)^{\frac{1}{p}} = \min_{i=1}^{n} |x_i - y_i|.$$

See, en.wikipedia.org/wiki/Minkowski_distance, math.stackexchange.com/questions/3267435/is-minkowski-distance-is-the-lp-norm-of-the-distance-between-two-points.

The Minkowski inequality establishes that the $L^p$ spaces are normed vector spaces. Let S be a measure space, let $1 \leq p < \infty$ and let $f$ and g be elements of $L^p(S)$. Then $f+g$ is in $L^p(S)$, and we have the triangle inequality $\|f+g\|_p \leq \|f\|_p + \|g\|_p$, with equality for $1<p<\infty$ if and only if $f$ and g are positively linearly dependent, i.e., $f=\lambda g$ for some $\lambda \geq 0$ or $g=0$. Here, the norm is given by:

$$\|f\|_p = \left(\int |f|^p d\mu\right)^{\frac{1}{p}},$$

if $p \leq \infty$, or in the case $p=\infty$ by the essential supremum $\|f\|_\infty = \text{ess}\sup_{x \in S} |f(x)|$. The Minkowski inequality is the triangle inequality in $L^p(S)$. In fact, it is a special case of the more general fact $$\|f\|_p = \sup_{\|g\|_q=1} \int |fg| d\mu, \ \frac{1}{p} + \frac{1}{q} = 1,$$

where it is easy to see that the right-hand side satisfies the triangular inequality.

Like Hölder's inequality, the Minkowski inequality can be specialized to sequences and vectors by using the counting measure:

$$\left(\sum_{k=1}^{n} |x_k + y_k|^p\right)^{1/p} \leq \left(\sum_{k=1}^{n} |x_k|^p\right)^{1/p} + \left(\sum_{k=1}^{n} |y_k|^p\right)^{1/p}$$

for all real (or complex) numbers x1, . . . , xn, y1, . . . , yn and where n is the cardinality of S (the number of elements in S). See, en.wikipedia.org/wiki/Minkowski_inequality.

SUMMARY OF THE INVENTION

The present technology involves a system and method for tuning the physical properties of a CPCS by selection different unit cells and orientation of the respective cells. The technology analyzes and predicts structural properties of CPCS based on cell geometry and orientation. The prediction uses finite element analysis, for example, and requires little experimental data to yield accurate predictions.

The effects of geometry on the compressive deformation responses of multiple CPCSs at macro scale are investigated both through both finite-element (FE) simulations and physical tests of 3D printed specimens. For example, the material constituent may be kept the same, and the unit cell changed. By standardizing the unit dimension and volume of each CPCS solid, mechanical behaviors of the structures can be tuned by solely changing the underlying shape of each unit cell and/or orientation of the array of unit cells. Such an analysis can provide designer the flexibility to choose among different shapes of unit cells for a given problem.

In some cases, the array of cells may be graded, according to one or more properties, and/or have regions with different patterns or orientations. A particular advantage of starting with a known unit cell is that bulk properties of structures form with arrays of unit cells may be modelled and predicted based on properties of individual unit cells, thereby setting an increment of the analysis of bulk properties at the unit size, in in many cases, boundary effects, i.e., partial cells at boundaries, and interface between unit cells and the surrounding shells may be estimated with reasonable accuracy, avoiding need for sub-unit cell scale analysis of structural properties at all.

Thus, by understanding the bulk properties of solids comprising 3D arrays of unit cells including cell type and cell orientation, and general properties of boundary effects, the structural properties of parts formed with the 3D arrays of unit cells may be predicted, and the selection of unit cell and orientation optimized.

CPCS solids were fabricated by a micro-stereolithography (μ-SLA) process. To obtain the mechanical behaviors, physical and finite-element (FE) simulated compression tests were both conducted, and numerical and experimental results compared. The results reveal that FE results can be predictive of physical test results for real CPCS parts.

CPCS have potential advantages over solid parts of the same shape and size in that they are lighter (unless filled with a more dense material), and can have tuned strength, stress, strain, elasticity, and other static and dynamic characteristics, and may have metamaterial characteristics (having a property that is not found in naturally occurring materials). When the composition material itself differs, the CPCS can be engineered and optimize to have an advantageous set of properties as compared to a homogeneous solid counterpart.

Functional parts are lattified to make them light-weight and strong, by filling the inside with CPCSs. A surrogate model-based optimization framework is therefore provided to optimize the filling orientation to make the lattified functional parts maintain or outperform the structural integrity and strength of non-optimized counterparts under prescribed compressive loading and boundary conditions.

Compressive deformation behaviors of cubic periodic cellular structures with similar or dissimilar geometries of underlying unit cells were investigated. An efficient optimization scheme is provided to design light-weight and strong functional parts with cubic periodic cellular structures filled internally in the optimum orientations.

It is therefore an object to provide a method of optimizing a functional structure, comprising: defining a boundary conditions for the functional structure; defining loading conditions for the functional structure; defining a periodic cell structure; and optimizing, with at least one automated processor, a spatial orientation of the defined periodic cell structure within the functional structure, according to a computer-implemented finite element model-based optimization, using a predictive finite element model with respect to load response of a standardized lattice, according to at least one criterion of the functional structure lattified with the defined periodic cell structure under the boundary conditions and loading conditions, wherein the predictive finite element model is a surrogate model derived from measurements of physical load response of a standardized lattice The method may further comprise optimizing, with the at least one automated processor, a spatial orientation of a plurality of different periodic cell structures within the functional structure, according to a respective computer-implemented finite element model, using a respective surrogate model for each respective different periodic cell structure.

The predictive finite element model may be parameterized based on a shape similarity of the defined periodic cell structure to properties of alternate periodic cell structures, the shape similarity being determined according to a periodic function analysis of a respective periodic cell structure lattice according to a rotation-based 3D shape probability distribution.

The method may further comprise comparing the optimized a spatial orientation of the defined periodic cell structure within the functional structure for at least two different defined periodic cell structures.

The loading conditions may comprise a compression load.

The optimizing may comprise performing a plurality of finite element analyses within a design space for a spatial orientation with a lowest cost according to a cost function which meets a predetermined functional criterion. The optimizing may comprise performing a plurality of finite element analyses within design space for a spatial orientation with a best functional performance which meets a predetermined cost criterion. The optimizing may comprise performing a plurality of finite element analyses within design space for a spatial orientation according to a distance function which is dependent on functional performance and cost.

The method may further comprise assessing a manufacturability of at least one functional structure lattified with the defined periodic cell structure. See, WO2020/0033932. See also en.wikipedia.org/wiki/Design_for_additive_manufacturing; Budinoff, Hannah Dawes, "Geometric Manufacturability Analysis for Additive Manufacturing", Ph.D. Dissertation 2019, escholarship.org/uc/item/9s3277jh. Manufacturability may encompass both additive manufacturing issues and manufacturability issues in general. The analysis may also encompass economic costs of manufacture, which can then be analyzed in conjunction with functional analysis, or as a separate screen or optimization.

The periodic analysis may comprise a Fourier transform. In other cases, a wavelet transform may be employed, using a predetermined mother wavelet or adaptively determined mother wavelets. The periodic analysis may comprise determining a Minkowski $L^N$ norm of the rotation-based 3D shape probability distribution.

The method may further comprise additively manufacturing the functional structure, with the optimized spatial orientation of the defined periodic cell structure lattified within the functional structure It is also an object to provide a method for comparing periodic cellular structures comprising unit cells, comprising: determining a respective periodic function associated with a lattice of a plurality of respective unit cell geometries; calculating, with at least one automated processor, a respective Minkowski $L^N$ norm of a plurality of probability distribution curves associated with the respective periodic function associated with the lattice of the plurality of respective unit cell geometries; and based on the calculated respective Minkowski $L^N$ norms, quantifying the respective unit cell geometries as being at least one of similar and dissimilar.

Each periodic function may comprise a three-dimensional set of weighted Fourier transform coefficients. The method may further comprise defining a surrogate model for a respective periodic cellular structure comprising the unit cells based on parameters of a finite element model of a similar periodic cellular structure. The surrogate model may employ radial basis functions.

It is a still further object to provide a method of preparing a three-dimensional structure subject to load constraints for additive manufacturing printing, comprising: defining a boundary conditions and load constraints for the three-dimensional structure; defining at least one periodic cell structure for lattifying the three-dimensional structure; generating a surrogate finite element model of the three dimensional structure for predicting a relationship between the boundary conditions, the load constraints, a respective periodic cell structure, and a three dimensional orientation angle of the periodic cell structure; and optimizing, with at least one automated processor, a lattifying of at least one volume of the three-dimensional structure using the at least one periodic structure, to define at least the three dimensional orientation angle of the periodic cell structure, according to a cost function while meeting the load constraints.

The load constraint may comprise a uniaxial compressive stress and the cost function may be associated with a mass of the lattified three-dimensional structure.

The optimizing may be further dependent on a shape of a non-lattified boundary region. The optimizing may further define a non-uniform offsetting of a shell of the three-dimensional structure.

The method may further comprise manufacturing the optimized three-dimensional structure, wherein the cost function comprises a term associated with a mass and a term associated with a stress concentration under a pre-determined loading condition, and the at least one automated processor optimizes to minimize the cost function.

The optimization may be dependent on a manufacturing economic cost. The cost function may further comprise a manufacturing economic cost. The manufacturing economic cost, in turn, may be dependent on materials cost, manufacturing time and/or machinery required, etc.

DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the nature and objects of the disclosure, reference should be made to the following detailed description taken in conjunction with the accompanying drawings.

FIG. 4A shows a diagram of Gaussian mapping used in computing the probability distribution curve of Euclidean distances. FIG. 4B shows probability distribution curves of the examples of $$f_3^3$$

and $$0.6f_3^{4,I} + 0.4f_8^{6,I}.$$

Figure 5:
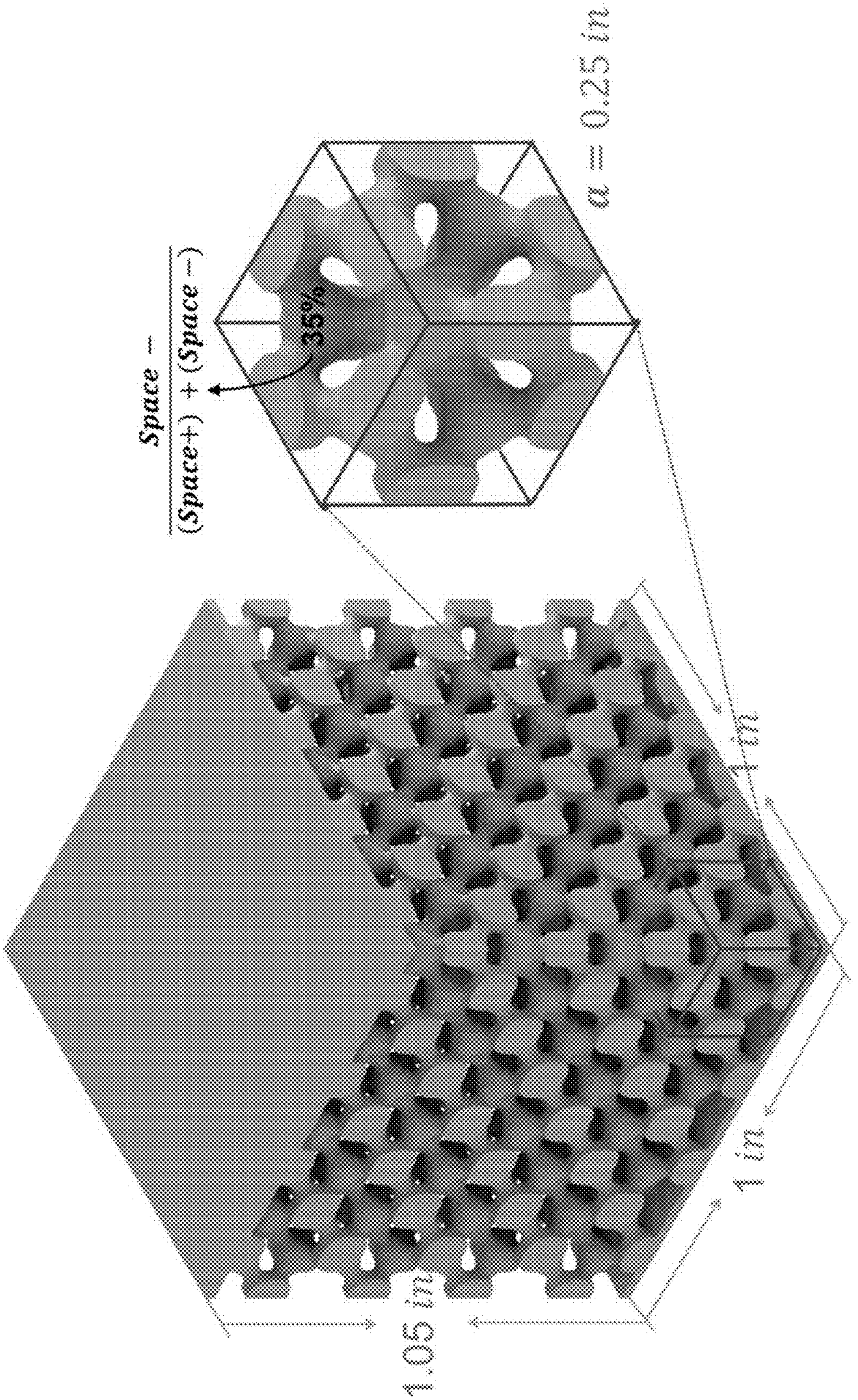

FIG. 5 illustrates a standardized cubic periodic cellular structure.

Figure 6:
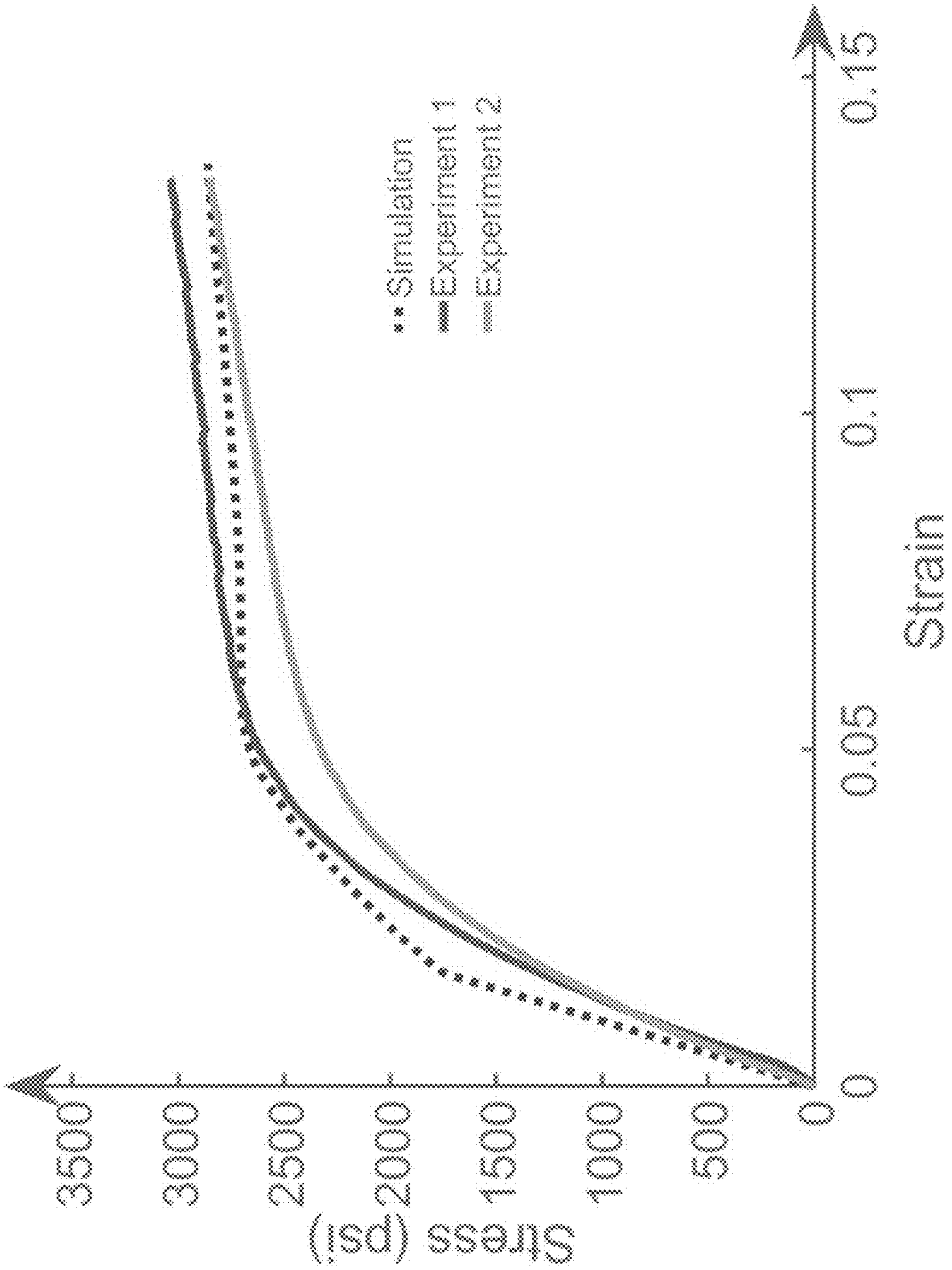

FIG. 6 shows stress-strain curves of cylindrical specimens in experimental and simulated compression tests.

Figure 7A:
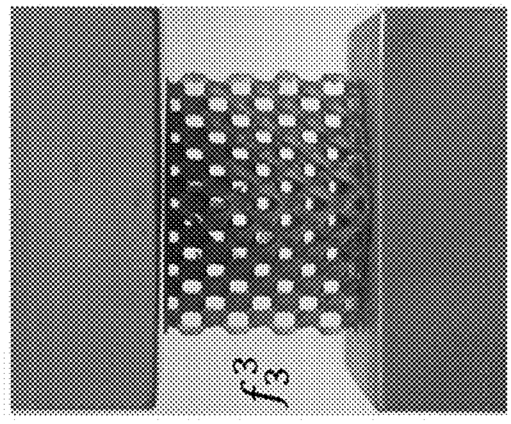
Figure 7B:
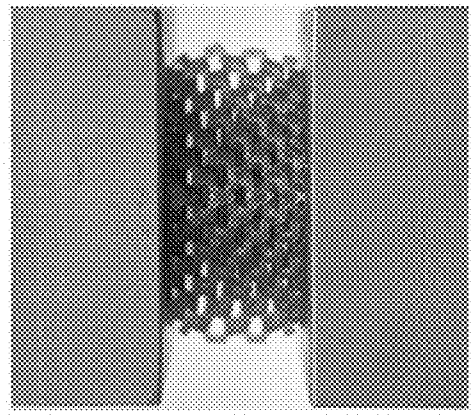
Figure 7C:
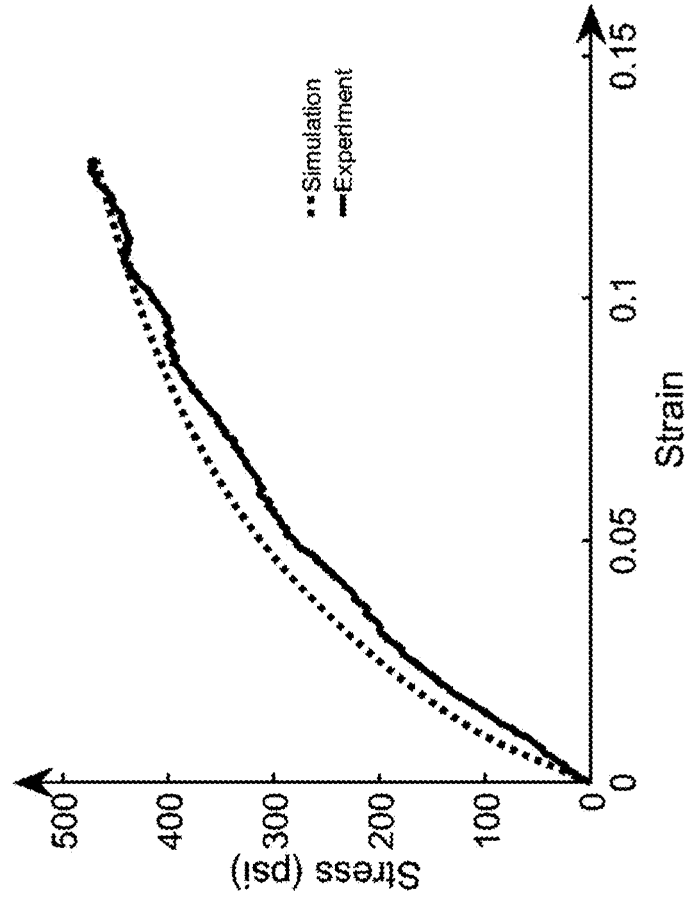

FIGS. 7A-7C show a 3D printed CPCS specimen $$f_3^3$$

in normal (FIG. 7A) and axially-compressed (FIG. 7B) states, and stress-strain curves of $$f_3^3$$

in experimental and simulated compression tests (FIG. 7C).

Figure 8:
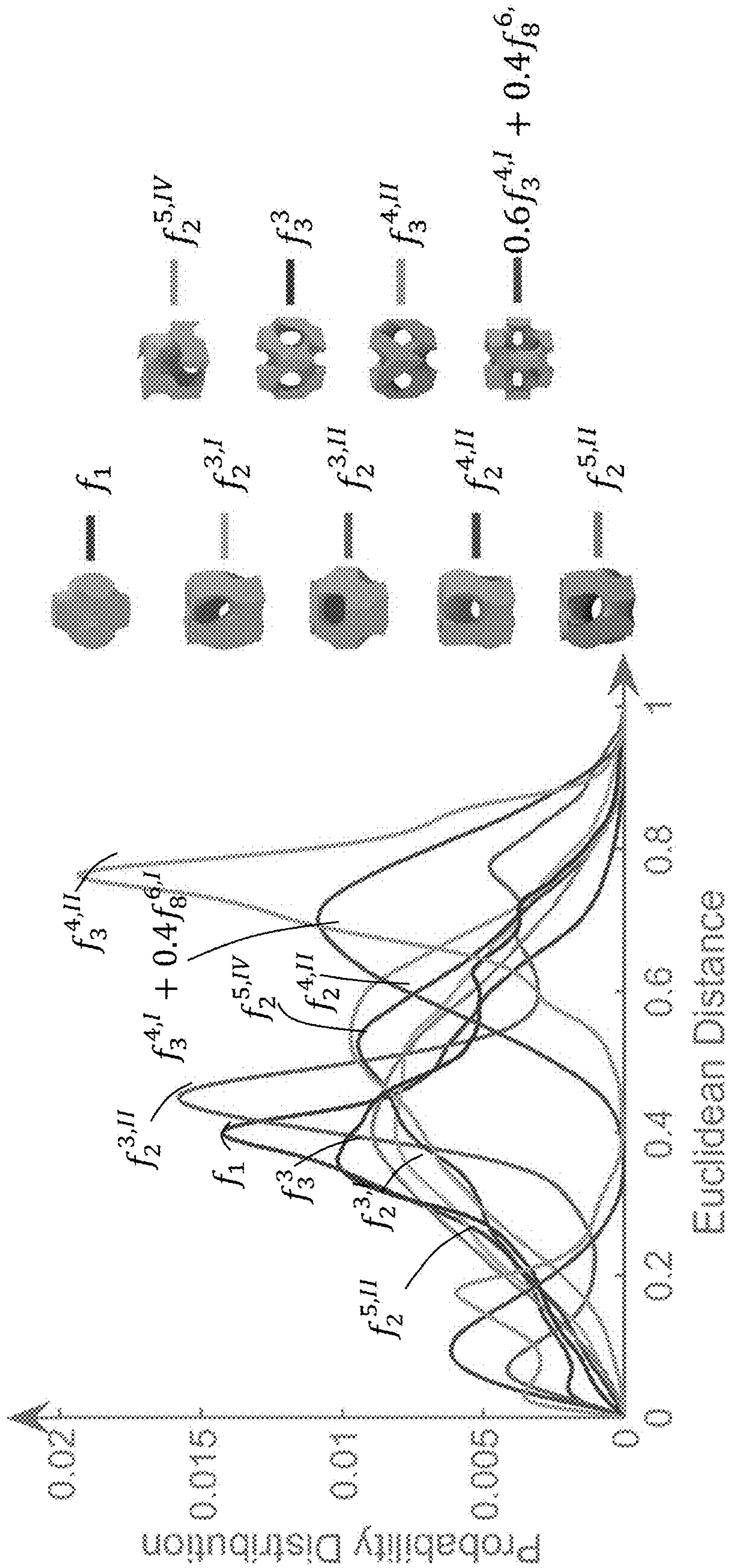

FIG. 8 shows probability distribution curves of nine different types of unit cells, based on 80,000 sampling points, 4,000 rotations, and 8 sections for Gaussian sphere segmentation in the rotation-based 3D shape descriptor.

Figure 9A:
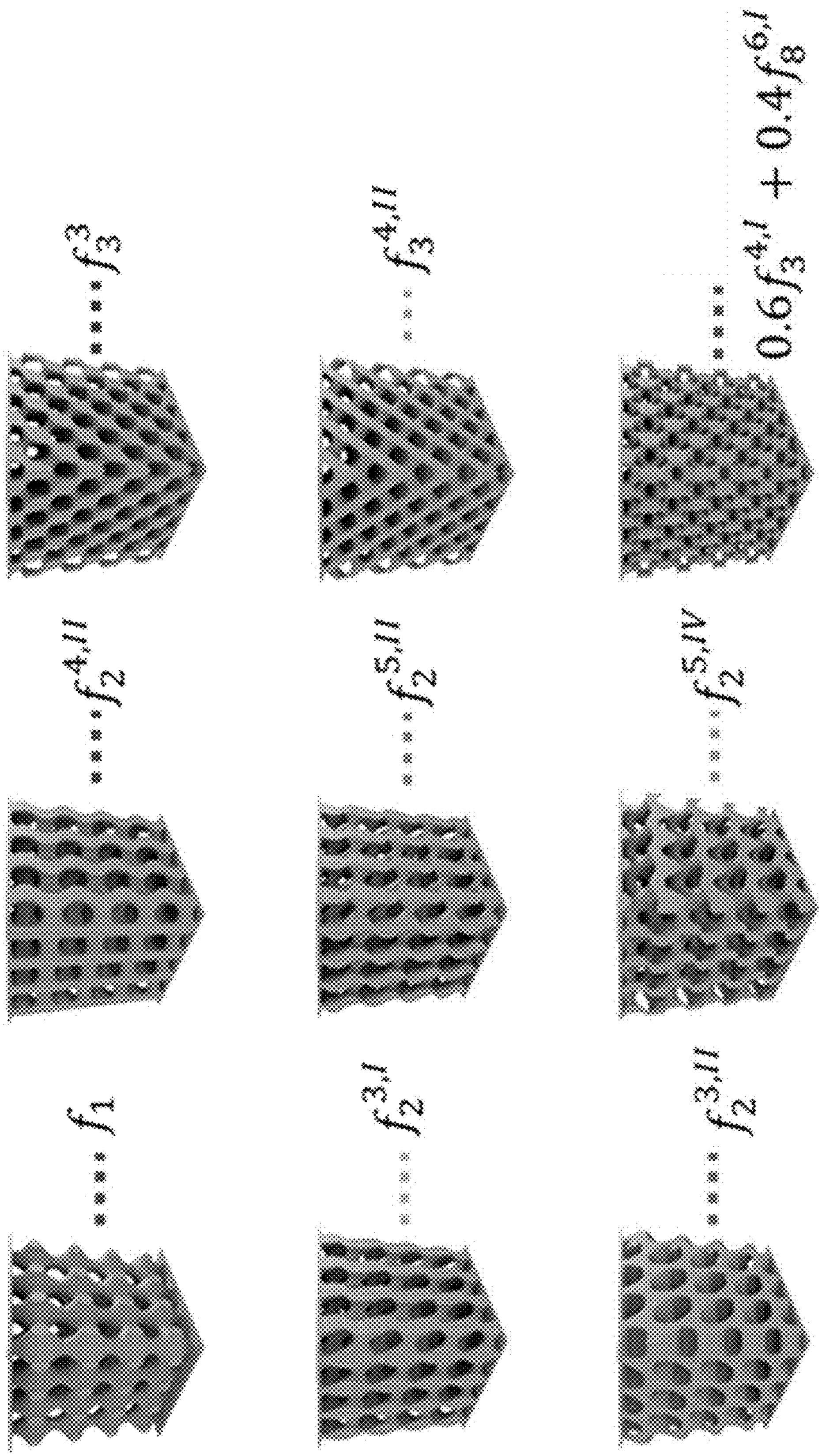
Figure 9B:
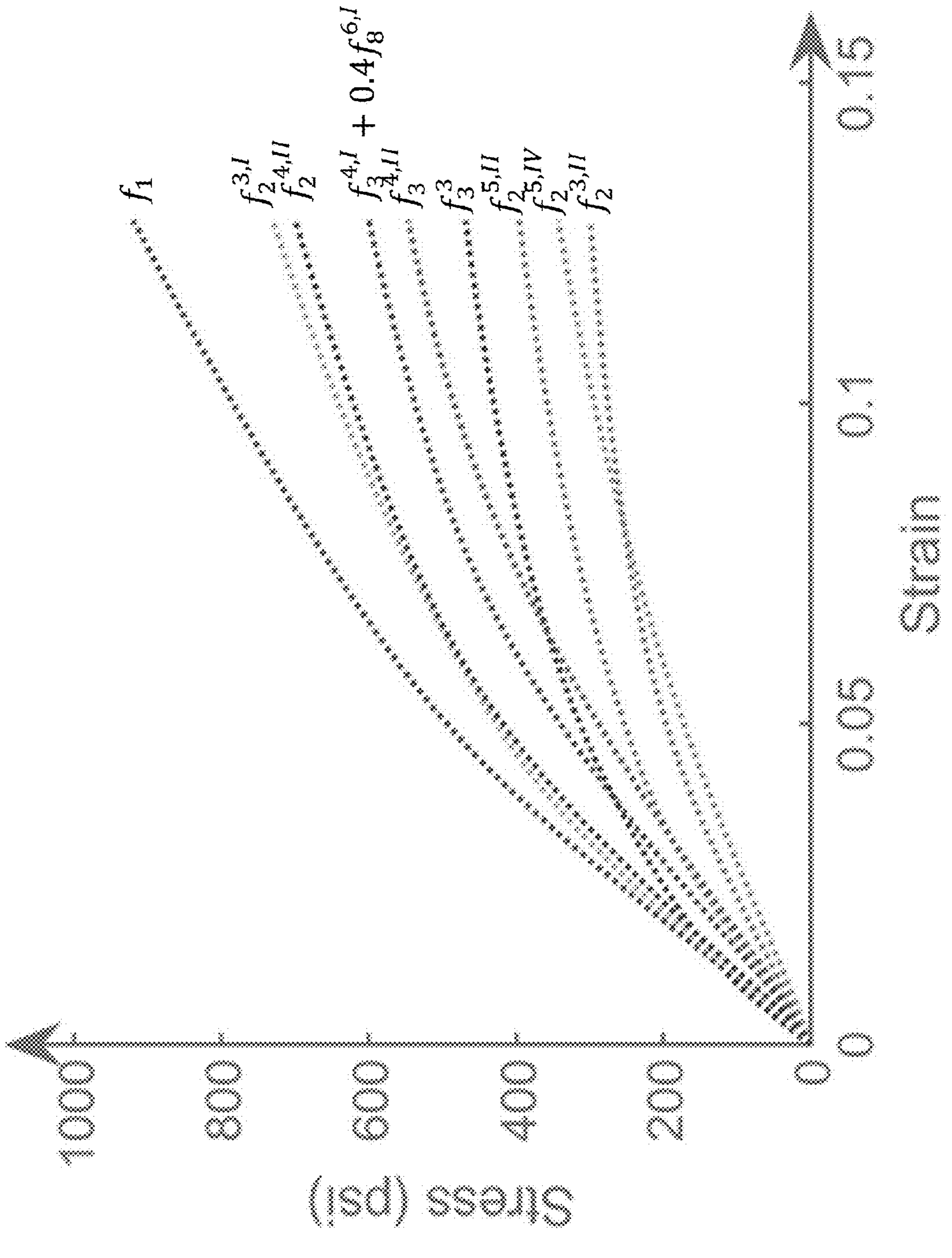

FIGS. 9A and 9B show stress-strain curves (FIG. 9B) of nine different standardized CPCSs (FIG. 9A) by FE simulated compression tests.

Figure 10A:
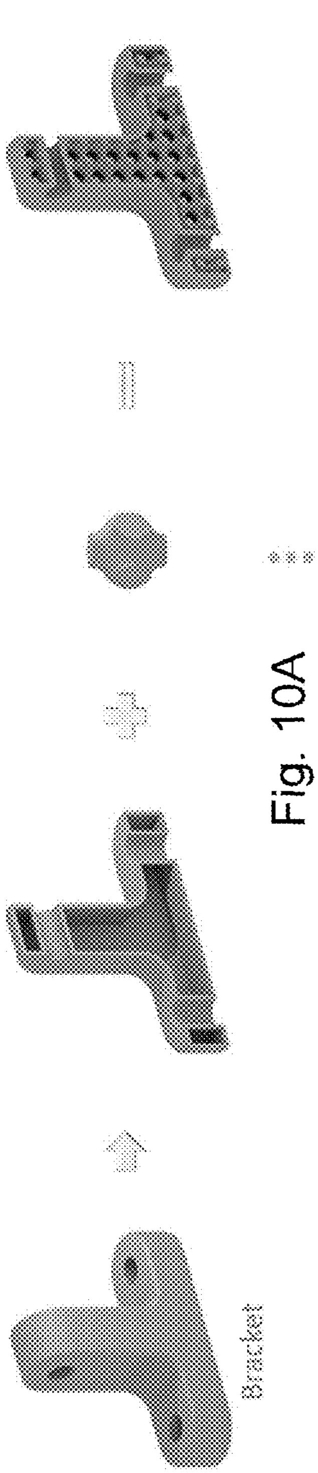
Figure 10B:
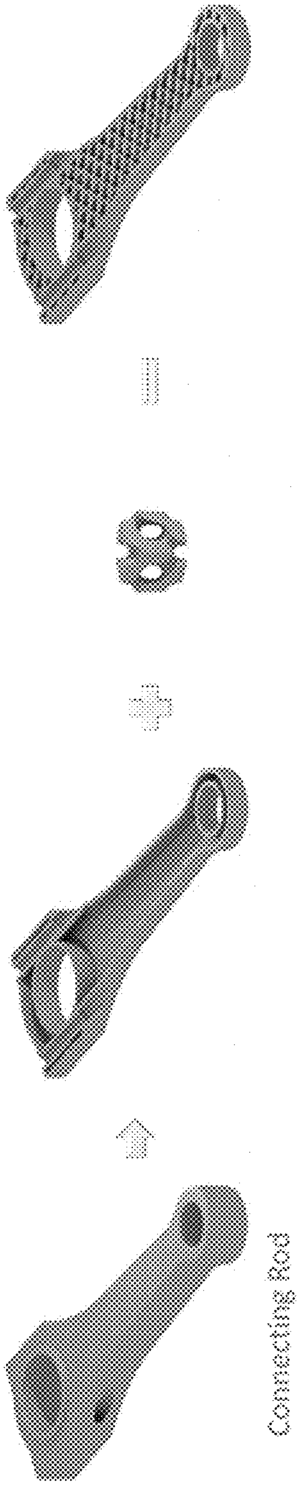
Figure 10C:
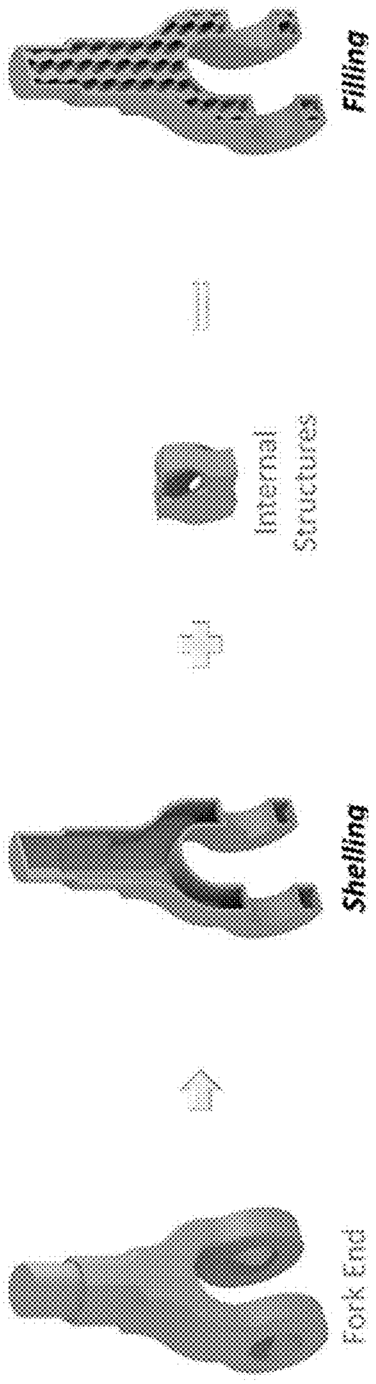

FIGS. 10A-10C show three illustrative examples of functionally lattified parts with different CPCSs filled internally. The three examples are bracket (FIG. 10A), connecting rod (FIG. 10B), and fork end (FIG. 10C).

Figure 11B:
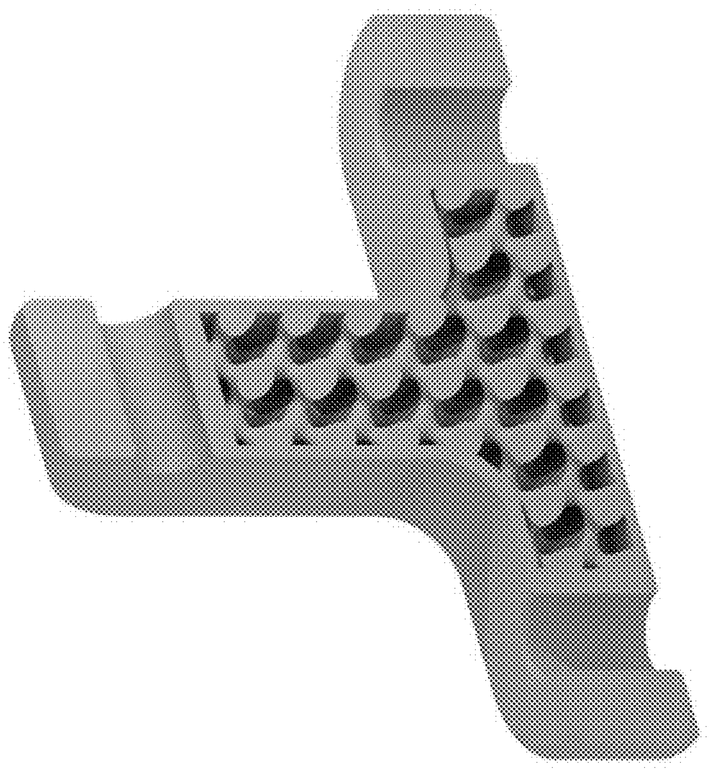
Figure 11A:
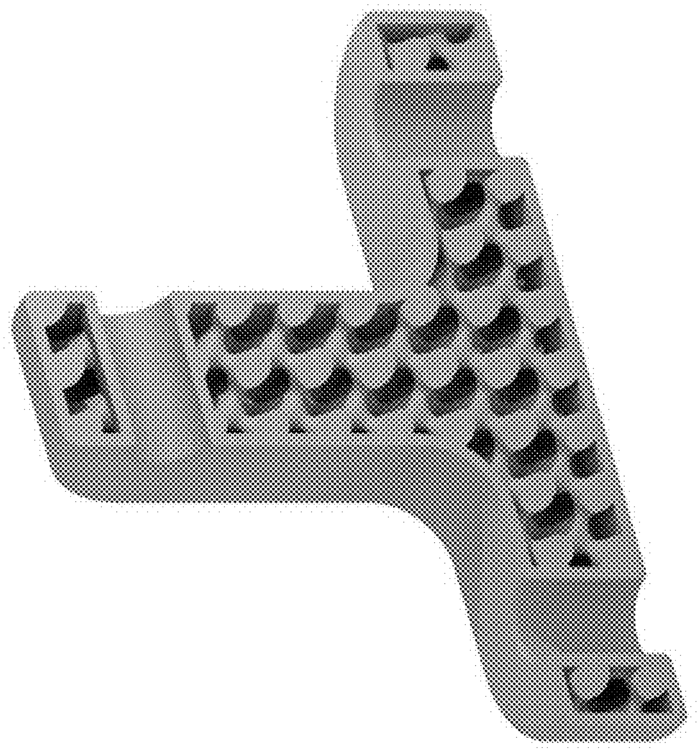

FIGS. 11A and 11B show the lattified bracket of FIG. 10A, with uniform offsetting and non-uniform offsetting. FIG. 11A shows uniform offsetting with a single wall thickness. FIG. 11B shows non-uniform offsetting with different thicknesses at different locations. The critical portions are solid.

Figure 12:
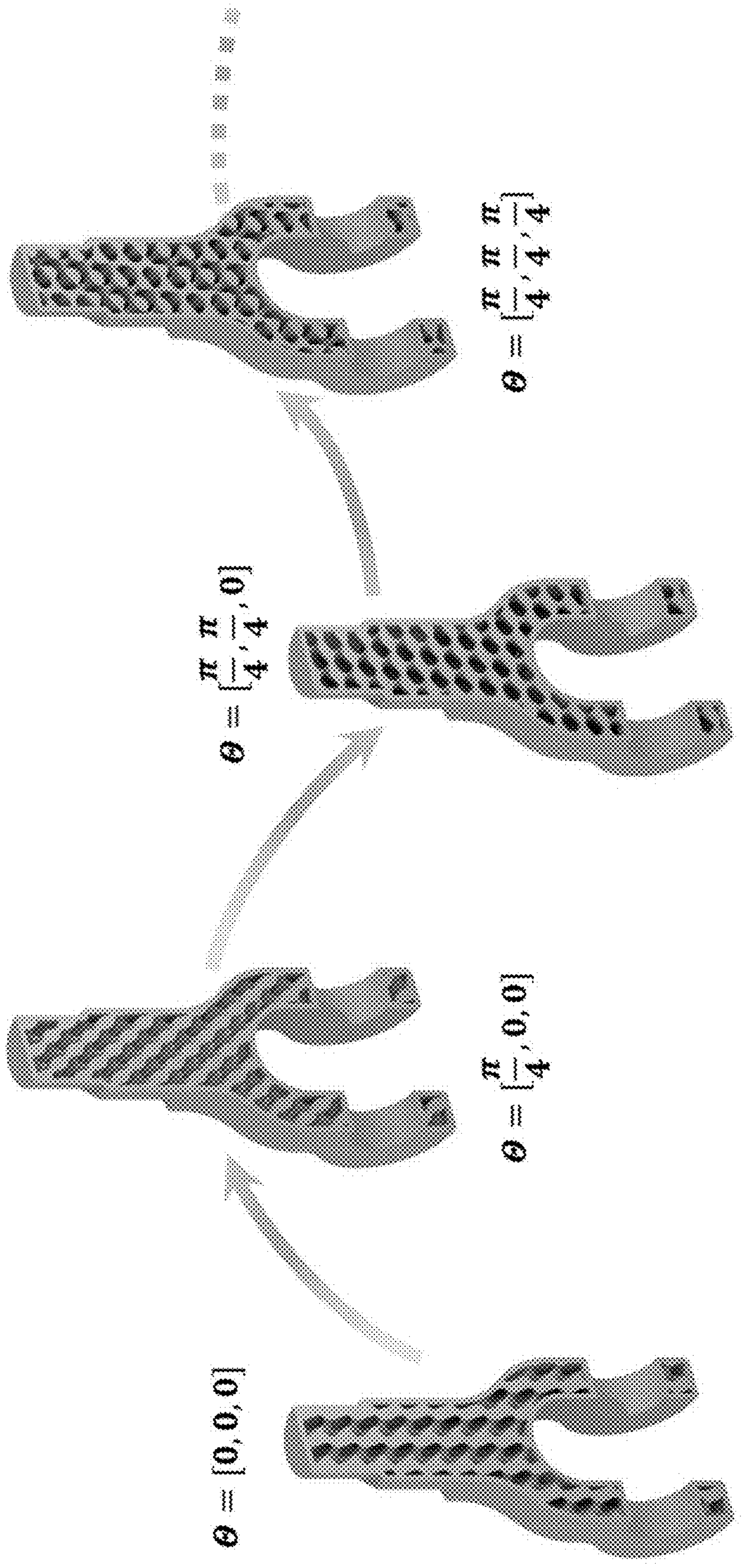

FIG. 12 illustrates four different orientations of the internal structures.

Figure 13A:
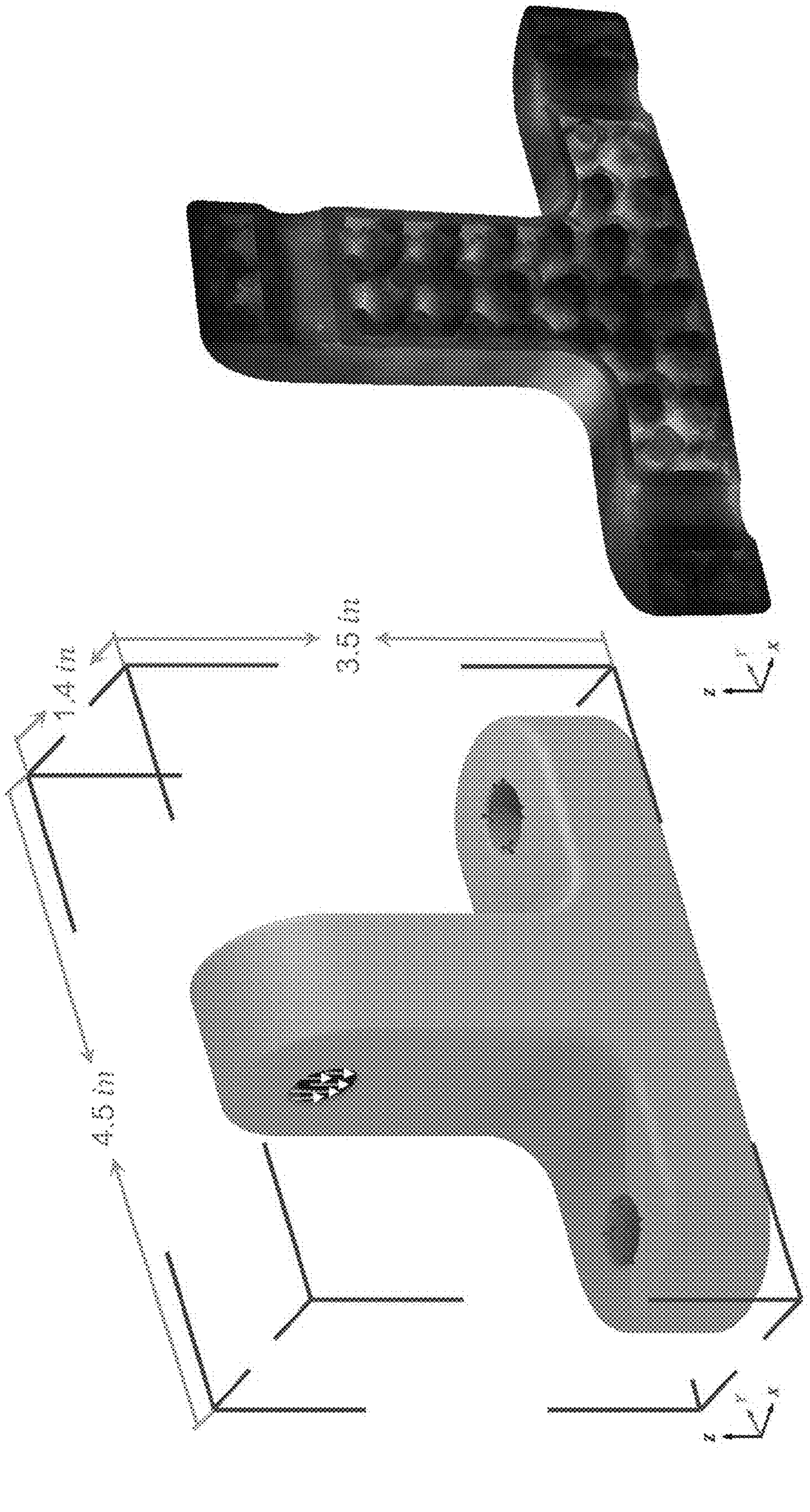
Figure 13B:
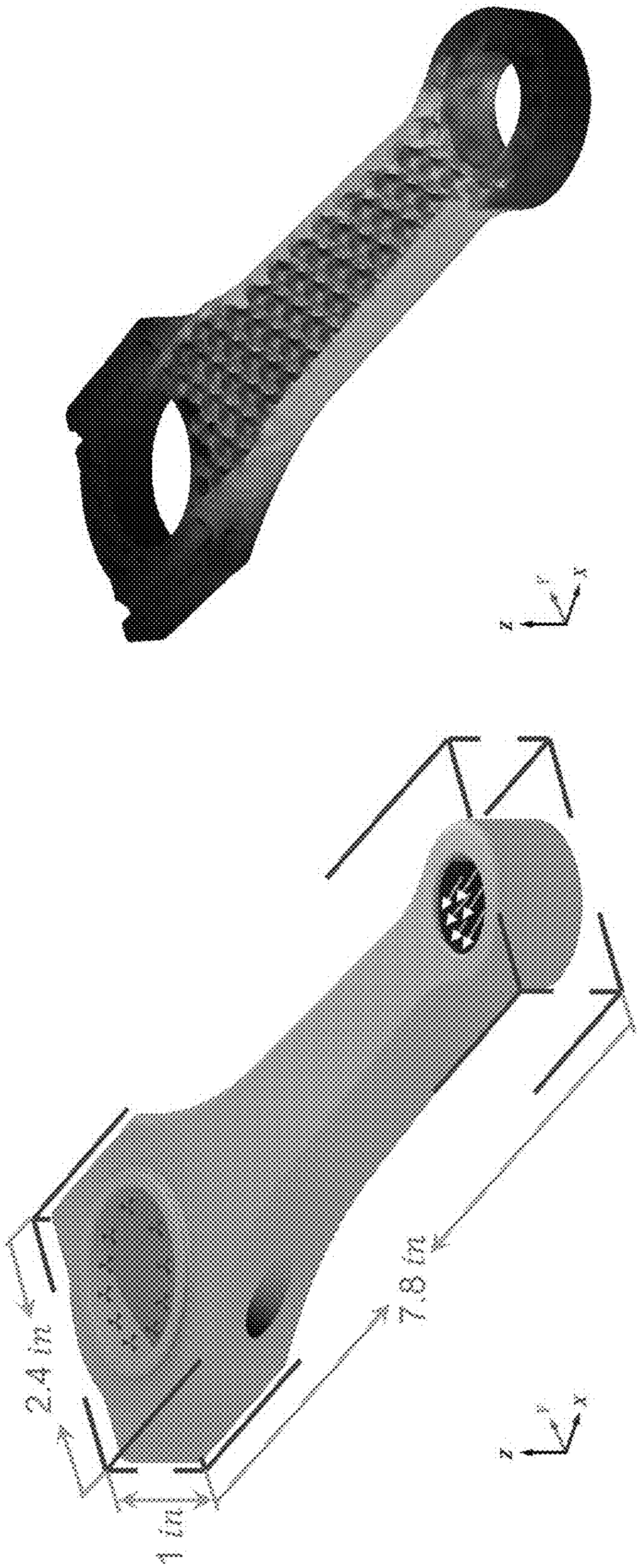
Figure 13C:
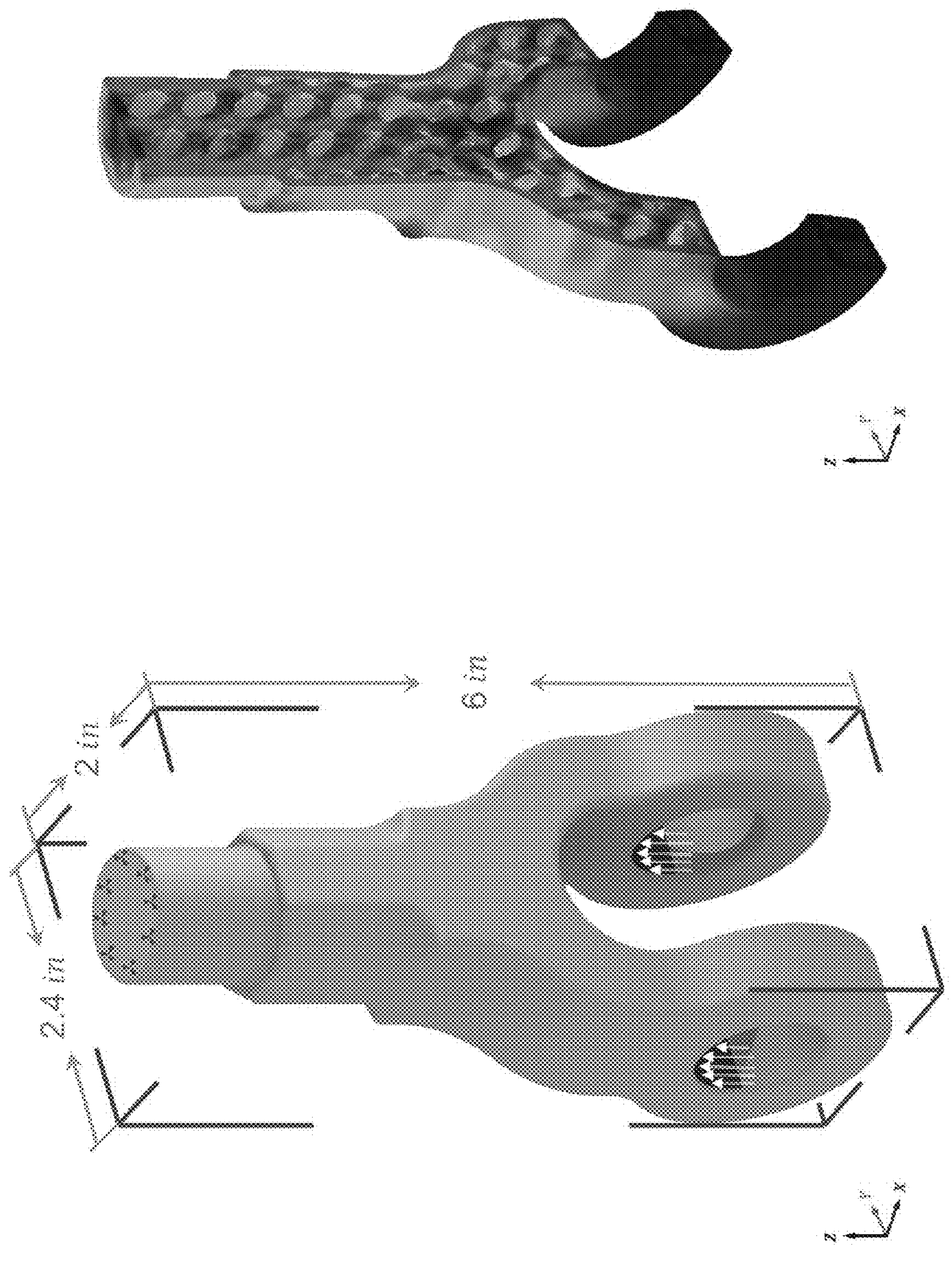

FIGS. 13A-13C show finite element models for optimization for the lattified parts shown in FIGS. 10A-10C. FIG. 13A shows Loading and boundary conditions of bracket (left) and a simulated contour of von-Mises stress (right). FIG. 13B shows loading and boundary conditions of connecting rod (left) and a simulated contour of von-Mises stress (right).

FIG. 13C shows loading and boundary conditions of fork end (left) and a simulated contour of von-Mises stress (right). Three (▲) in different directions symbolize a fixed boundary condition along all three coordinates. Arrows (→) point out a pressure loading condition and the direction it is applied in. The shell thickness of the three parts is all set to 0.08 in.

Figure 14A:
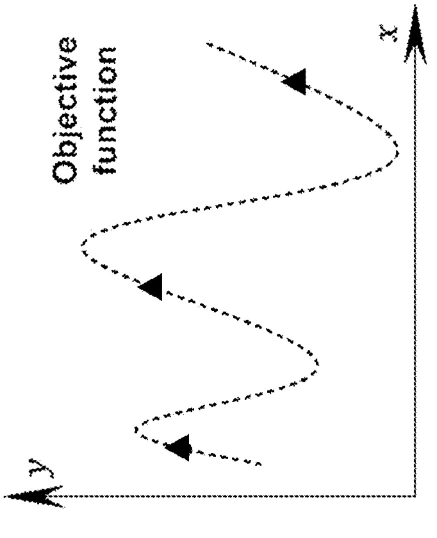
Figure 14B:
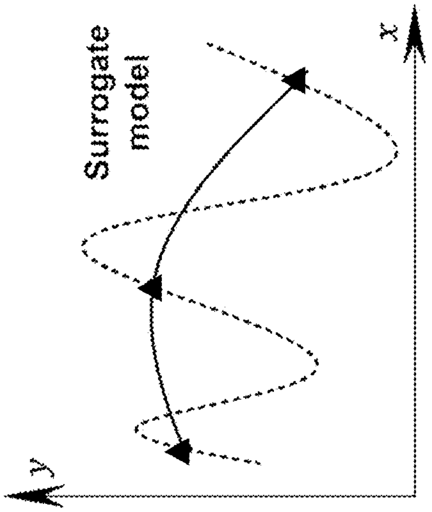
Figure 14C:
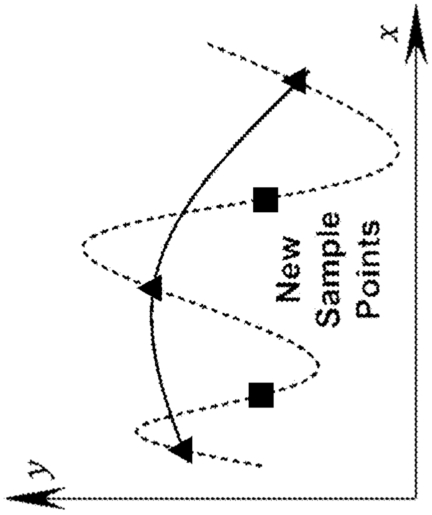
Figure 14D:
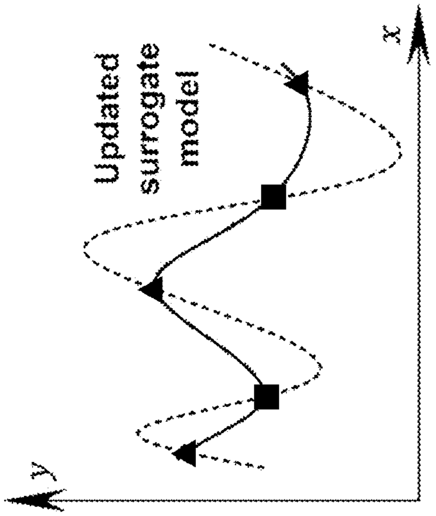
Figure 14E:
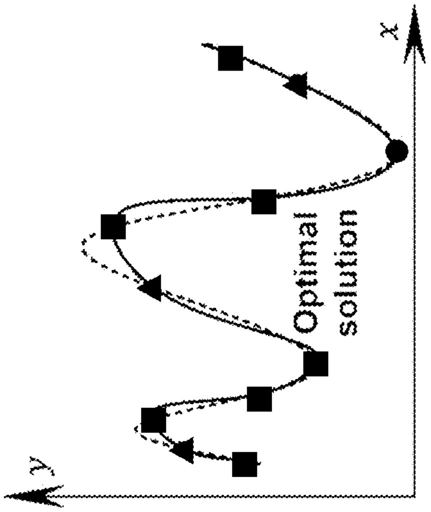

FIGS. 14A-14E show a one-dimensional example of surrogate model-based optimization. FIG. 14A shows an objective cost function (---) and initial design space (▲). FIG. 14B shows a surrogate model (—) mapped to the initial design space. FIG. 14C shows new sample points (■) generated in the next iteration. FIG. 14D shows a surrogate model updated based on information from new sample points. FIG. 14E shows that, after iteratively updating and achieving convergence, an optimum solution (●) obtained.

Figure 15:
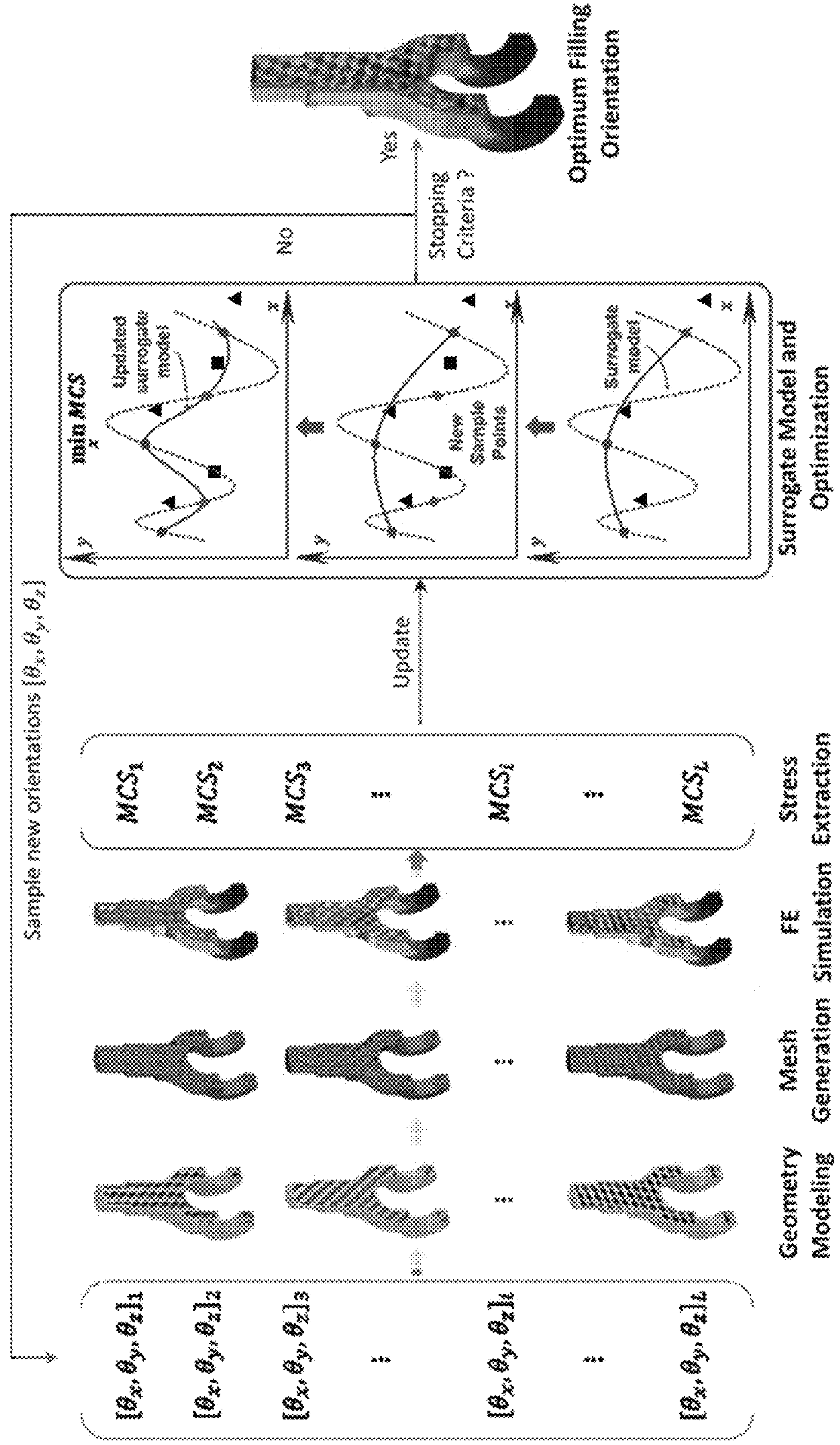

FIG. 15 shows a flowchart of the specific simulation-based optimization problem using surrogate model according to FIGS. 14A-14E.

Figure 16:
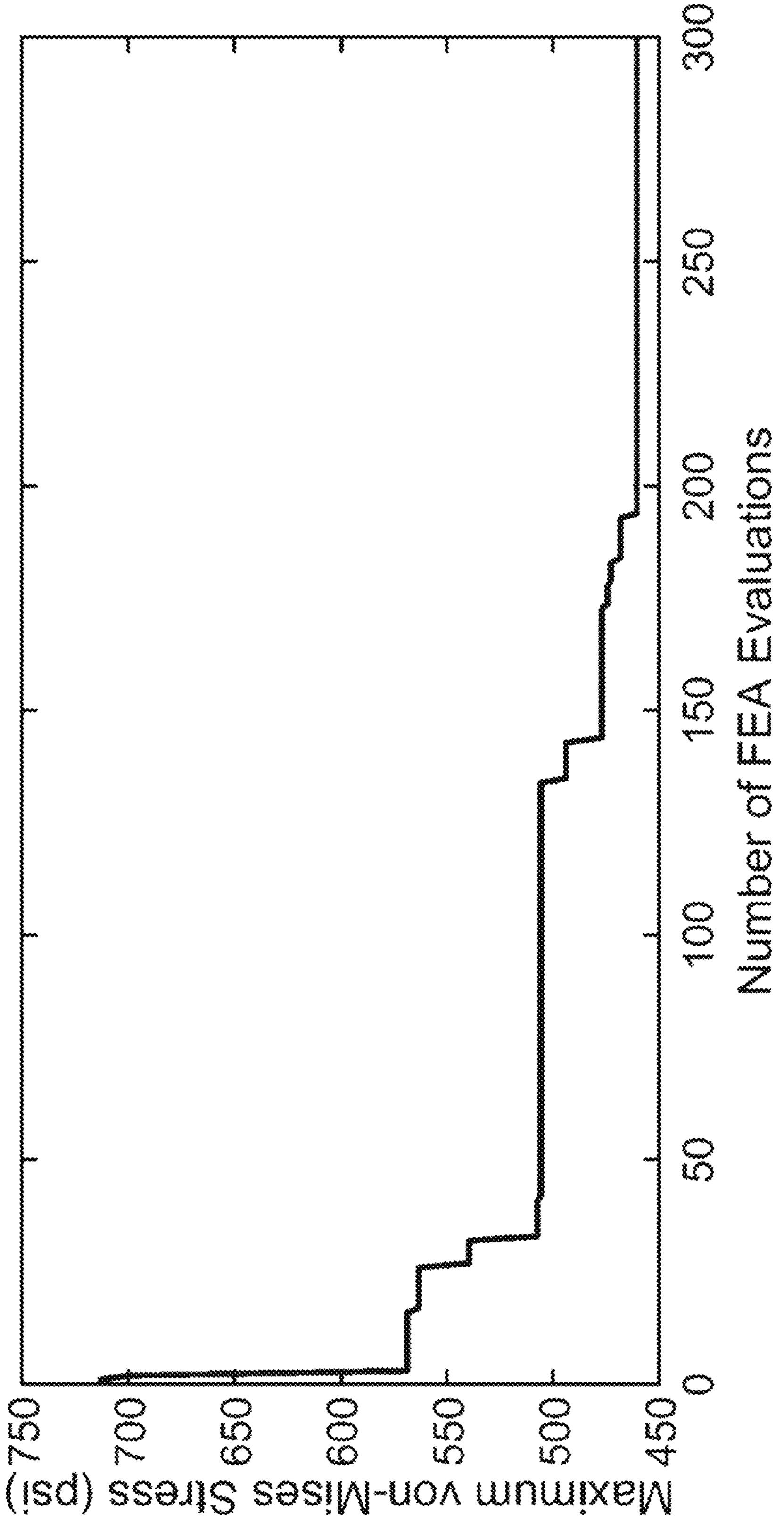

FIG. 16 shows a graph of the performance of surrogate model-based optimization for problem configuration in FIG. 13B. With surrogate model-based optimization, the best objective value can be obtained with 194 evaluations.

Figure 17A:
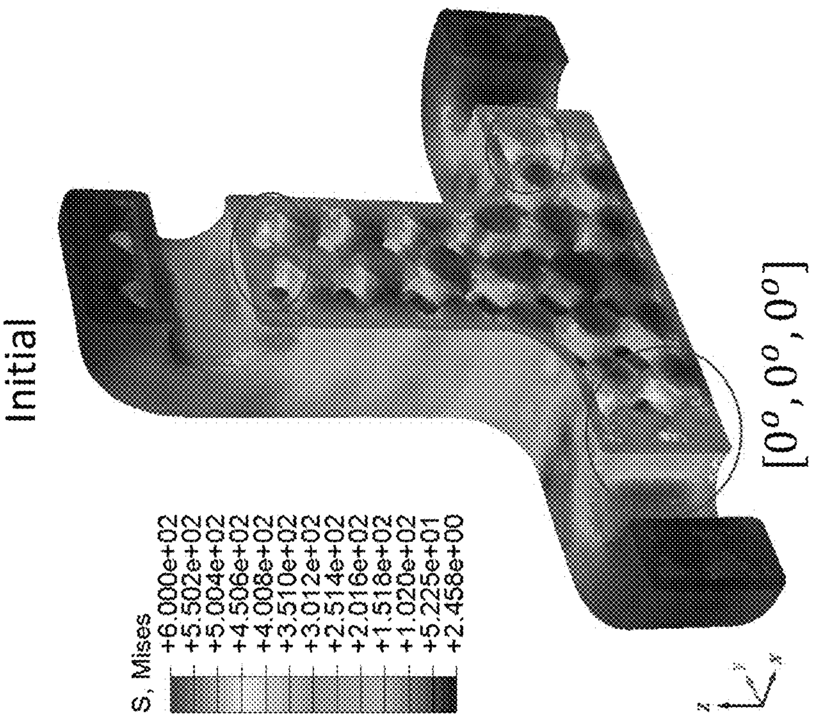
Figure 17B:
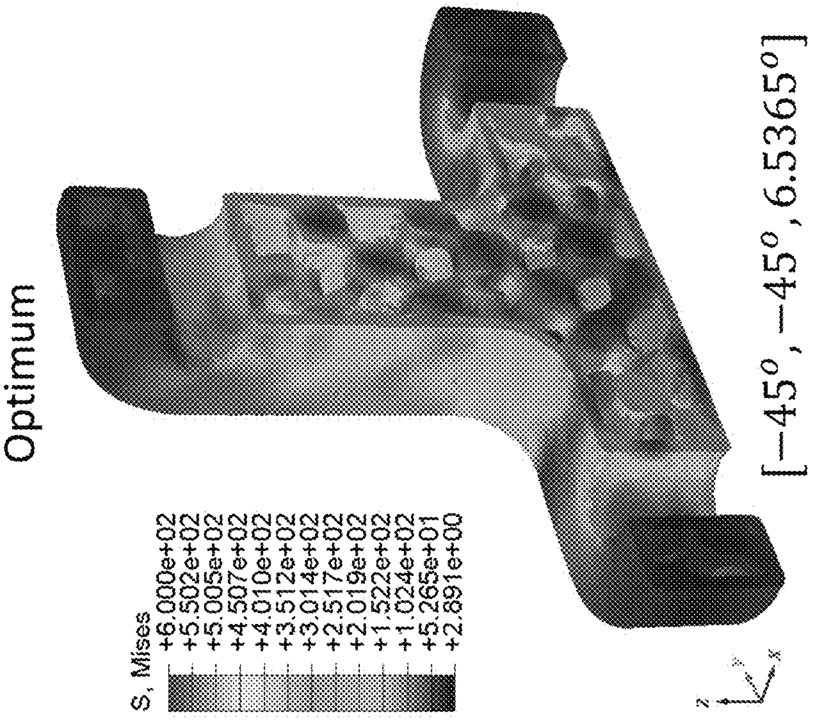
Figure 17C:
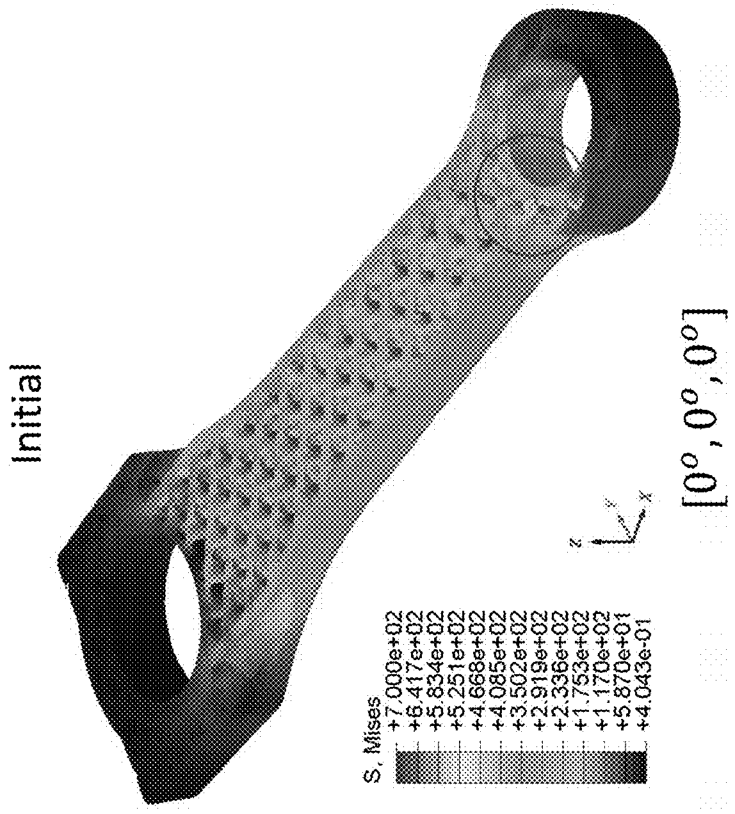
Figure 17D:
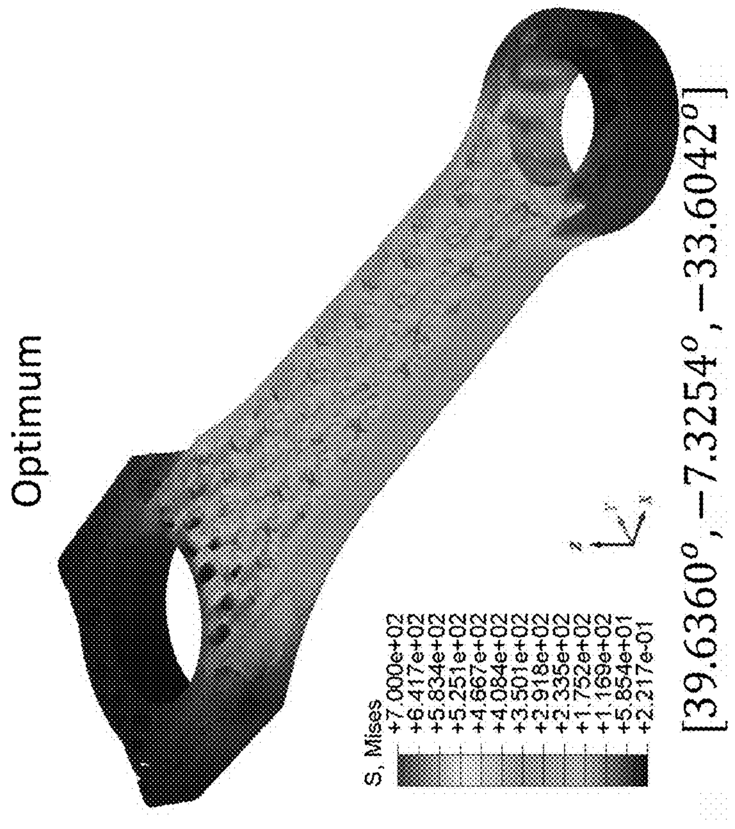

FIGS. 17A-17F show Optimization results of the filling orientation. FIGS. 17A-17B show FEA results of bracket with original and optimum filling orientations of internal structure $f_1$. FIGS. 17C-17D show FEA results of connecting rod with original and optimum filling orientations of internal structure $$f_3^3.$$

Figure 17E:
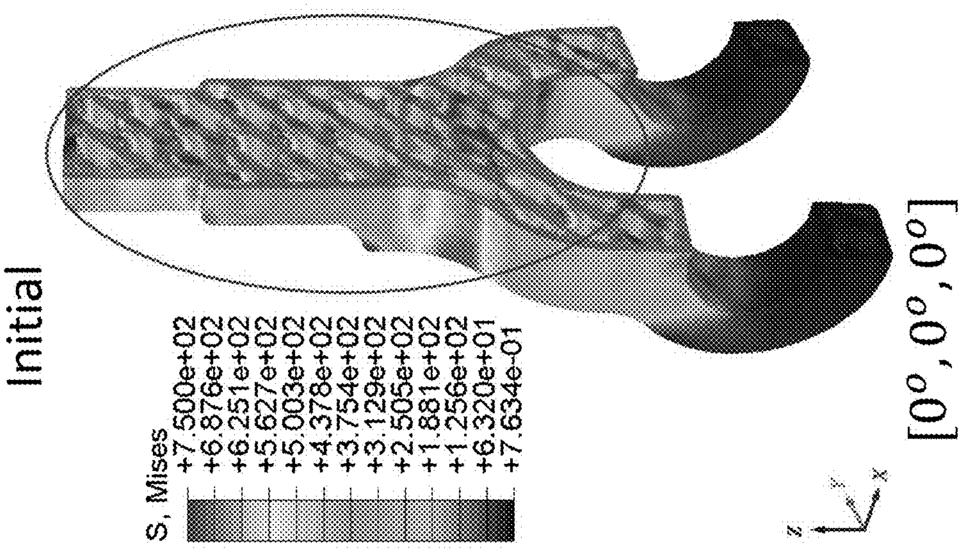
Figure 17F:
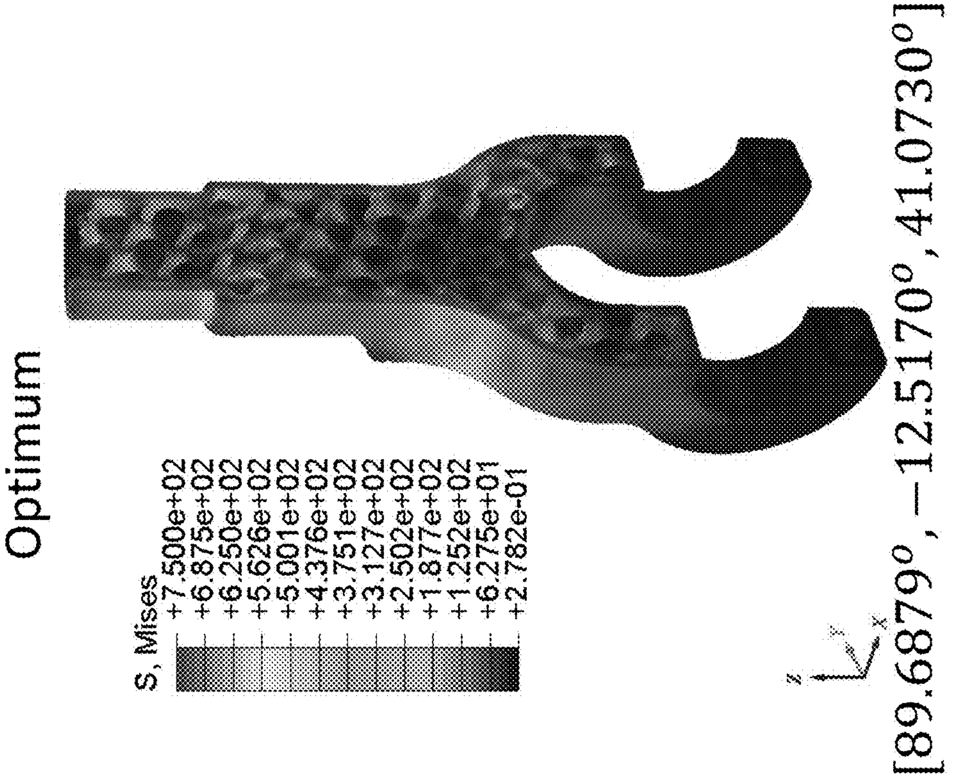

FIGS. 17E-17F show FEA results of fork end with original and optimum filling orientations of internal structure $$f_2^{3,I}.$$

The optimum filling orientations effectively remove the concentrated stresses of the three examples under the same loading and boundary conditions.

Figure 18A:
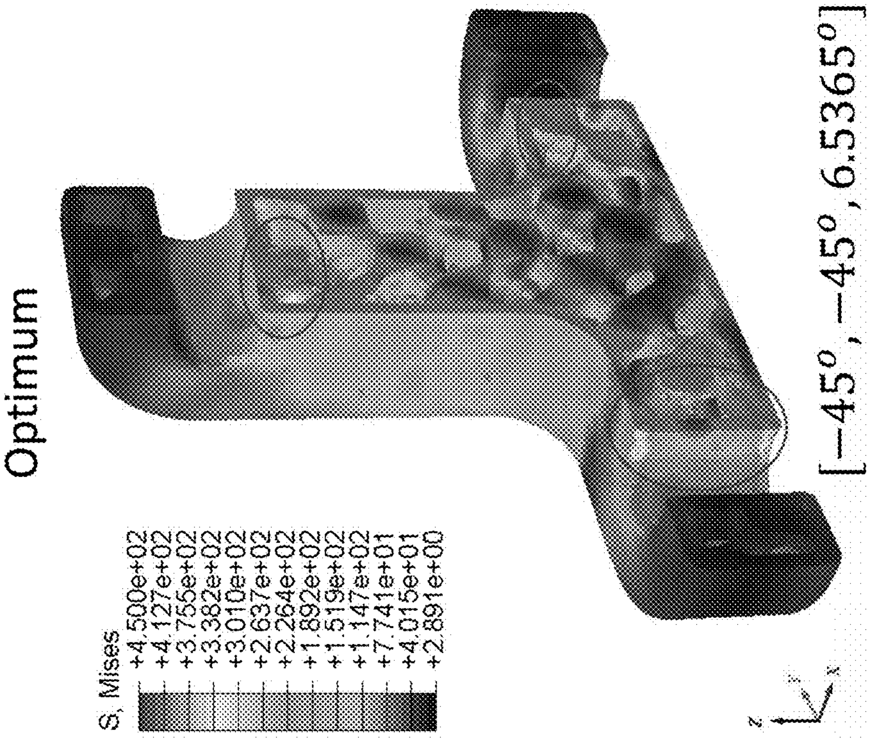
Figure 18B:
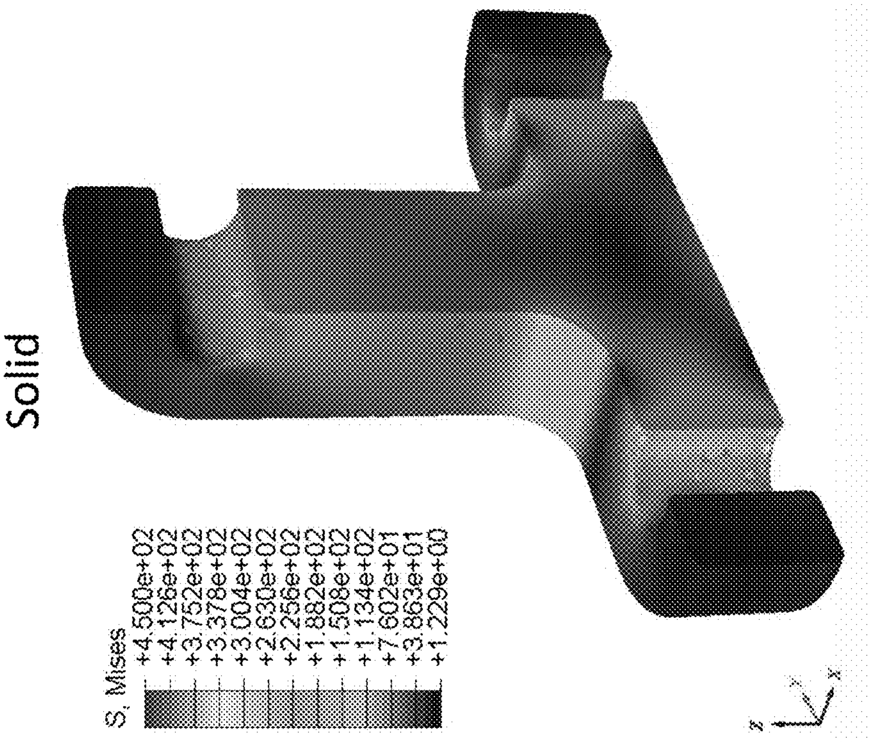
Figure 18C:
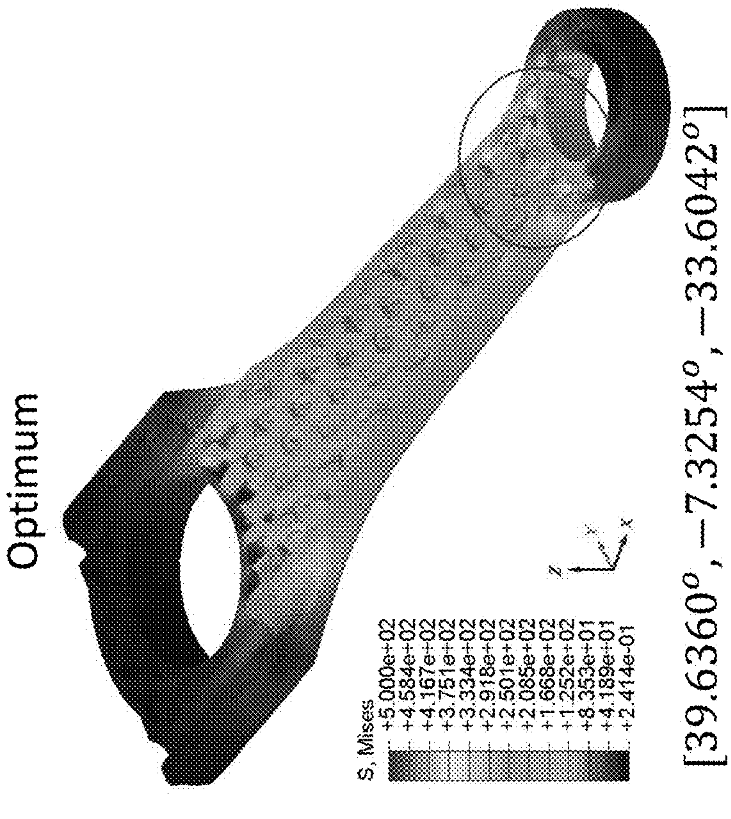
Figure 18D:
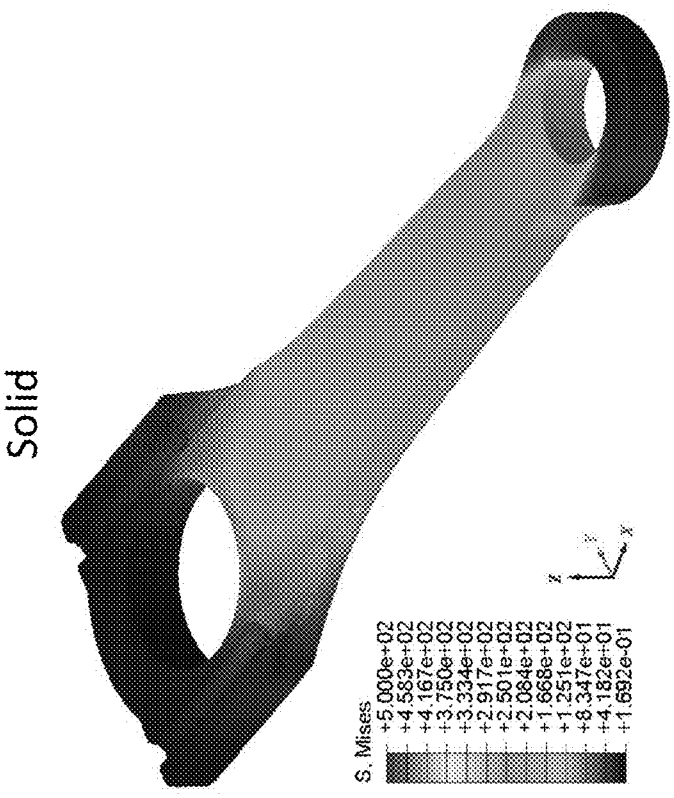
Figure 18F:
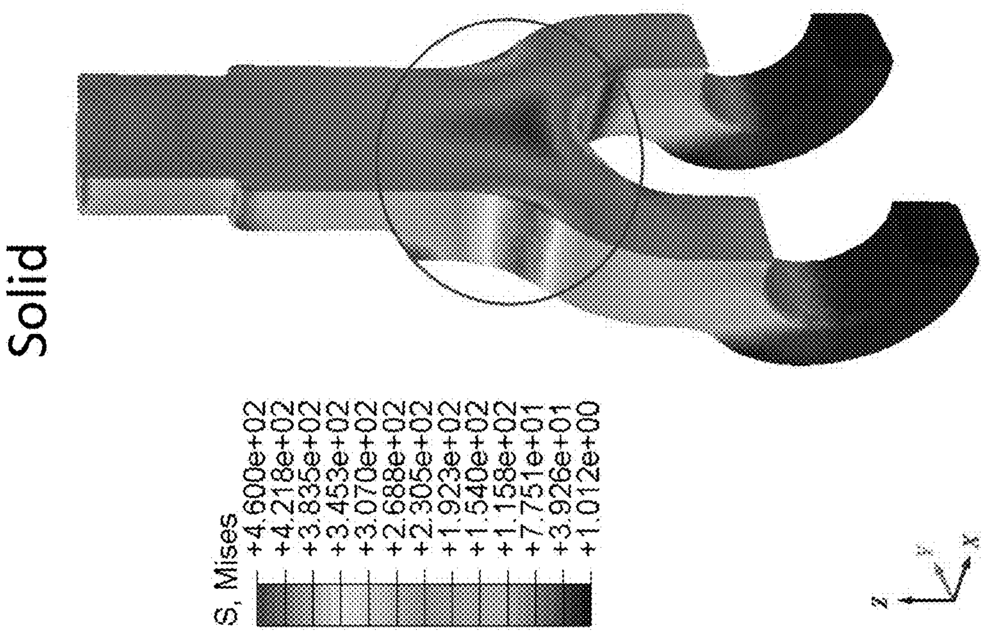
Figure 18E:
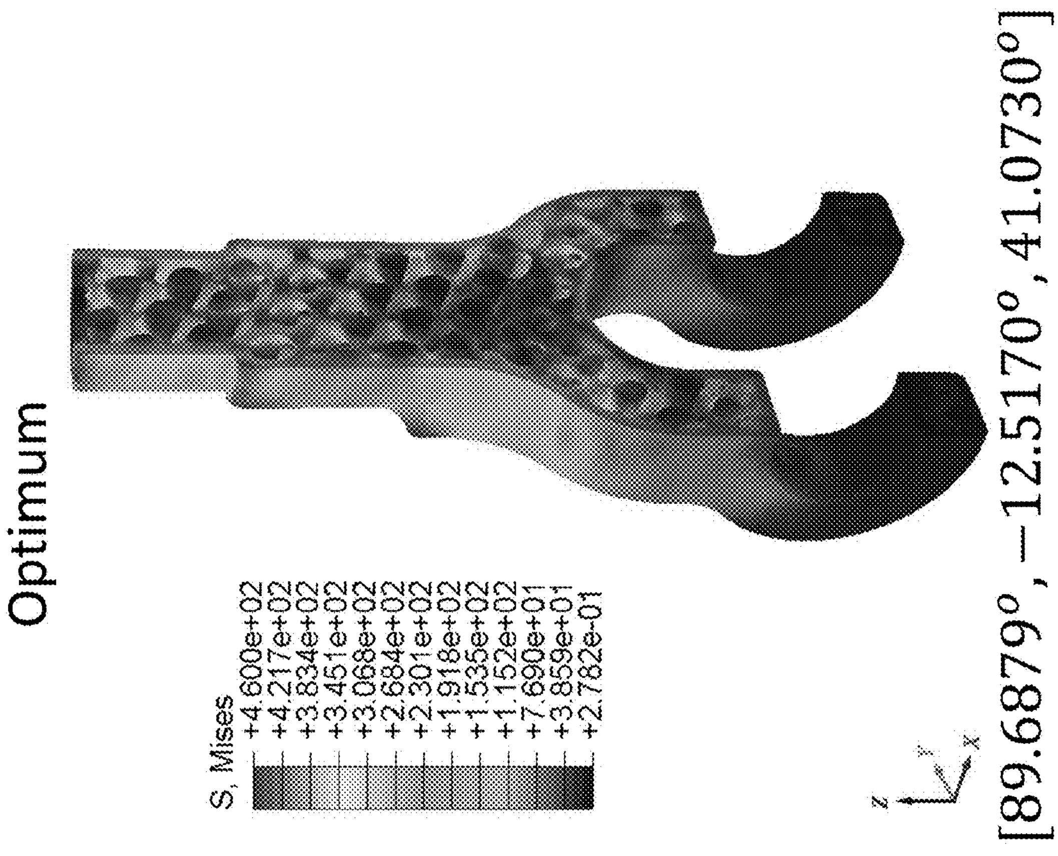

FIGS. 18A-18F show performance comparisons between optimized lattified parts and solid parts. FIGS. 18A and 18B show FEA results of bracket with optimum filling orientations of internal structure $f_1$ and solid bracket. FIGS. 18C and 18D show FEA results of connecting rod with optimum filling orientations of internal structure $$f_3^3$$

and solid connecting rod. FIGS. 18E and 18F show FEA results of fork end with optimum filling orientations of internal structure $$f_2^{3,I}$$

and solid fork end.

Figure 19A:
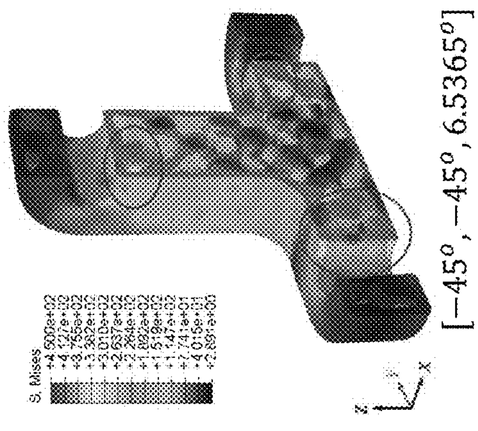
Figure 19B:
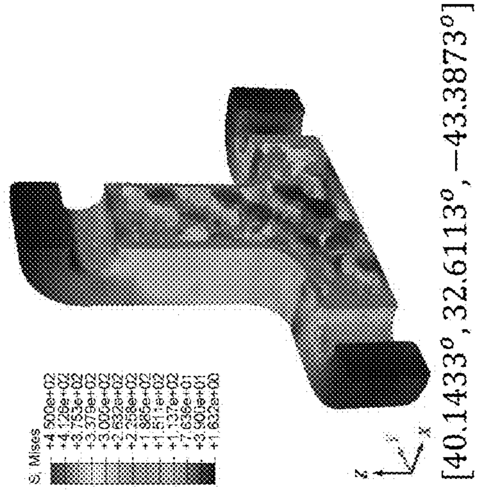
Figure 19C:
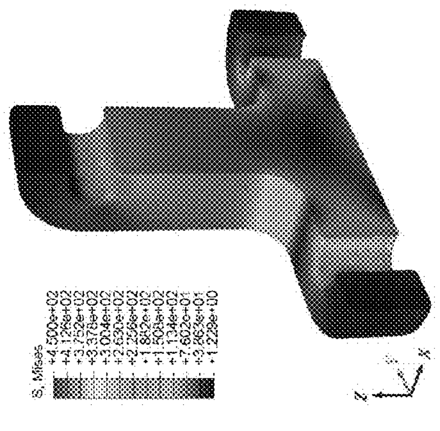

FIGS. 19A-19C show performance comparison between corresponding brackets which are optimized uniformly offset, optimized non-uniformly offset, and solid parts.

Figure 20A:
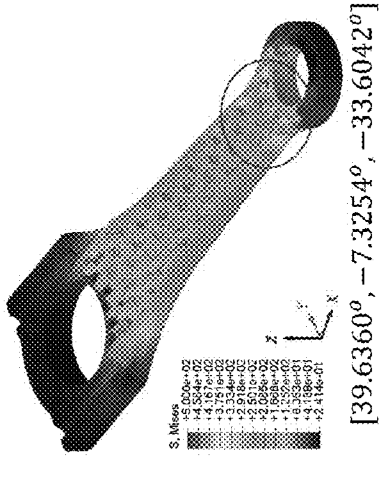
Figure 20B:
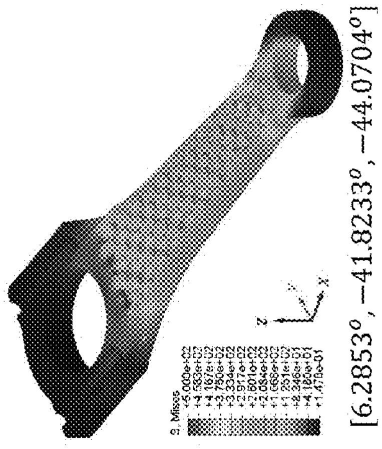
Figure 20C:
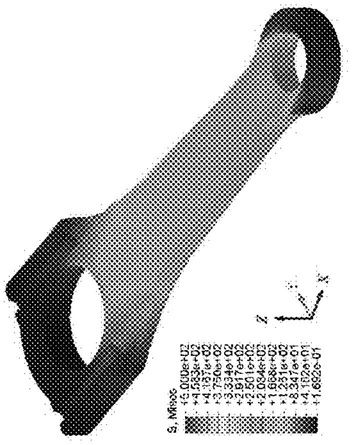

FIGS. 20A-20C show performance comparison between corresponding connecting rods which are optimized uniformly offset, optimized non-uniformly offset, and solid parts.

FIG. 21 shows a periodic function and model for different morphologies.

DETAILED DESCRIPTION OF THE DISCLOSURE

2. Framework Overview

Figure 1:
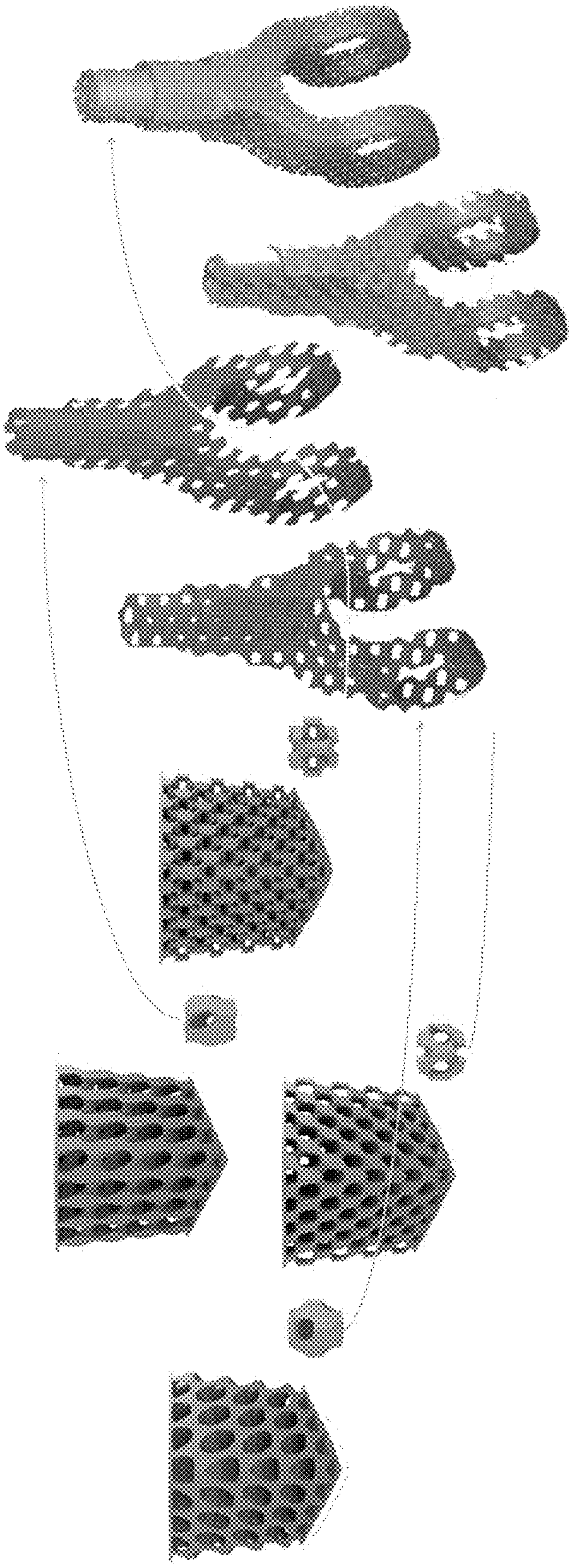
FIG. 1 shows cubic periodic cellular structures (CPCSs) (left) and lattified functional parts (right).

FIG. 1 shows cubic periodic cellular structures (CPCSs) and lattified functional parts. Left: A set of different cubic periodic cellular structures are investigated to answer the research question: Can seemingly different geometries of the unit cell result in similar mechanical behaviors?Right: Illustrative example of a fork end made lighter by lattifying it with cubic periodic cellular structures filled inside. A surrogate model-based optimization framework allows optimization of the filling orientation to make light-weight and strong function parts under compressive loading environments.

Figure 2B:
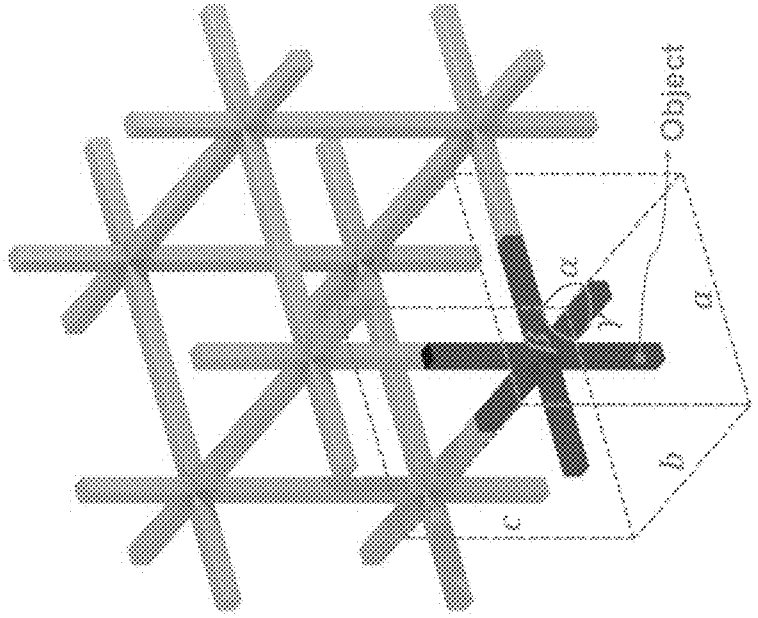
FIG. 2B shows that the unit cell of FIG. 2A repeats in a cubic phase where the edge length a=b=c and the interaxial angle $\alpha=\beta=\gamma=90°$.
Figure 2A:
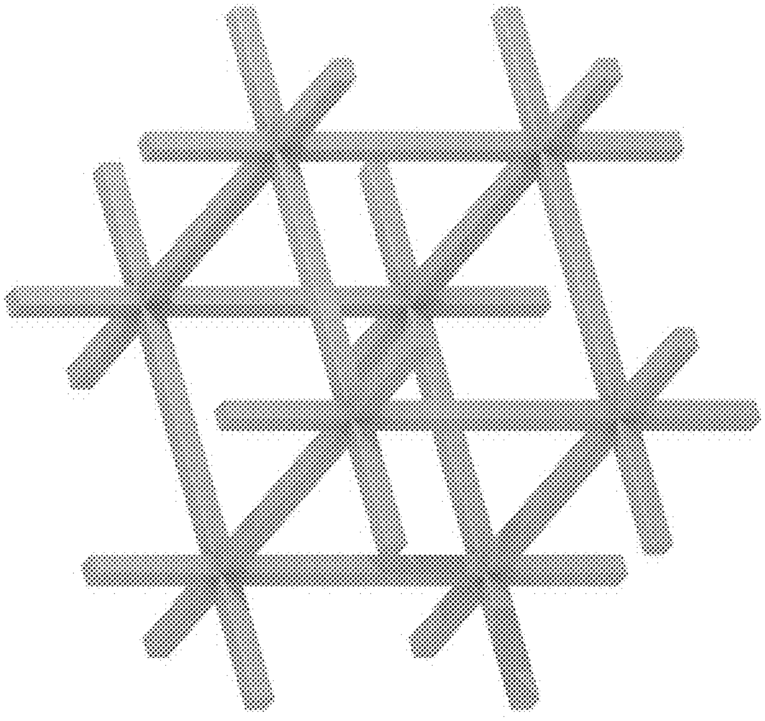
FIG. 2A the simplest example of cubic periodic cellular structure with the repeating object as crossing square rods.

FIGS. 2A and 2B show cubic periodic cellular structure. FIG. 2A shows the simplest example of cubic periodic cellular structure with the repeating object as crossing square rods. FIG. 2B shows the unit cell repeats in a cubic phase where the edge length a=b=c and the interaxial angle $\alpha=\beta=\gamma=90°$.

Figure 3A:
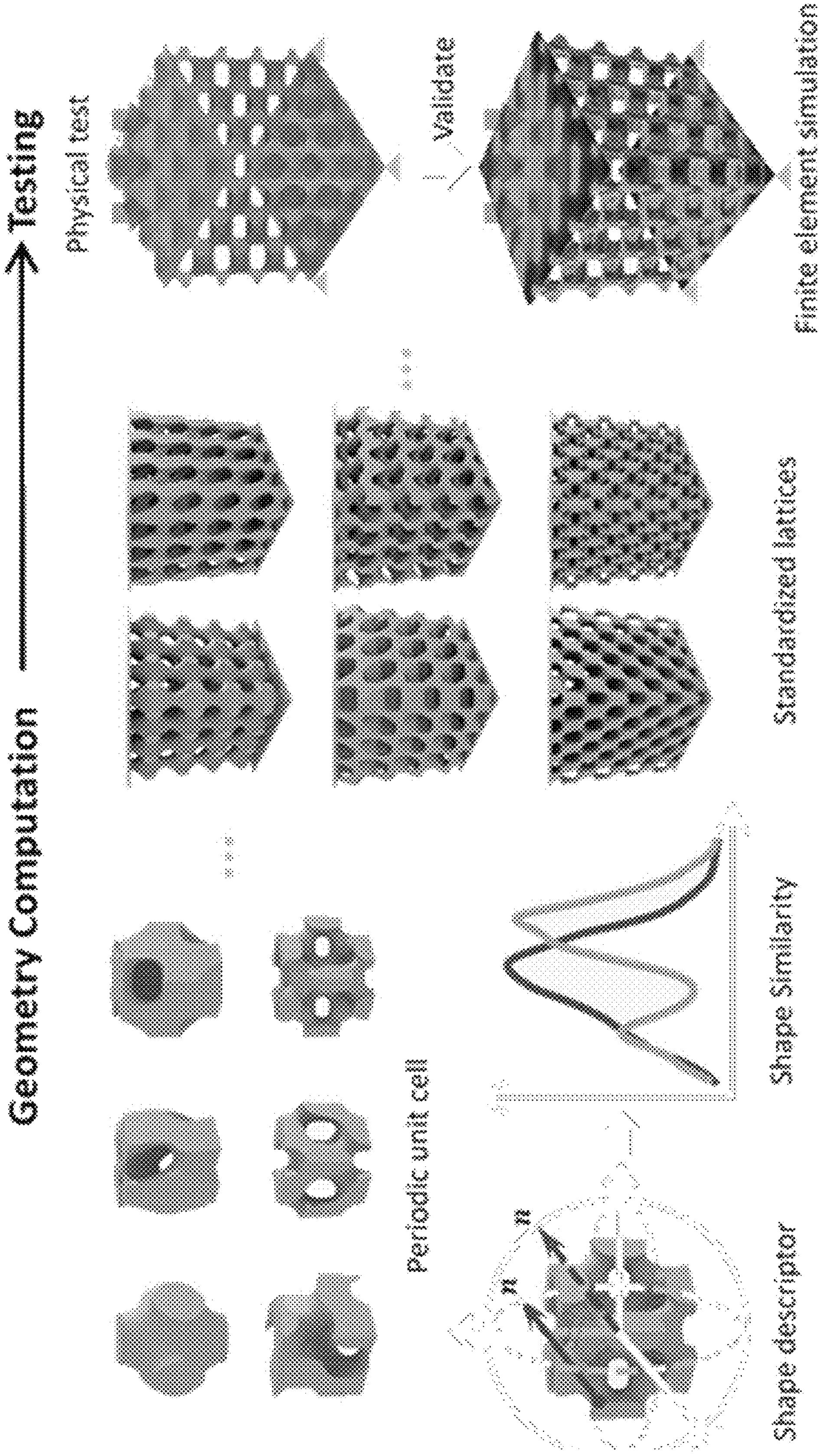
FIGS. 3A and 3B show an overview a framework for addressing optimization of the lattified functional part.
Figure 3B:
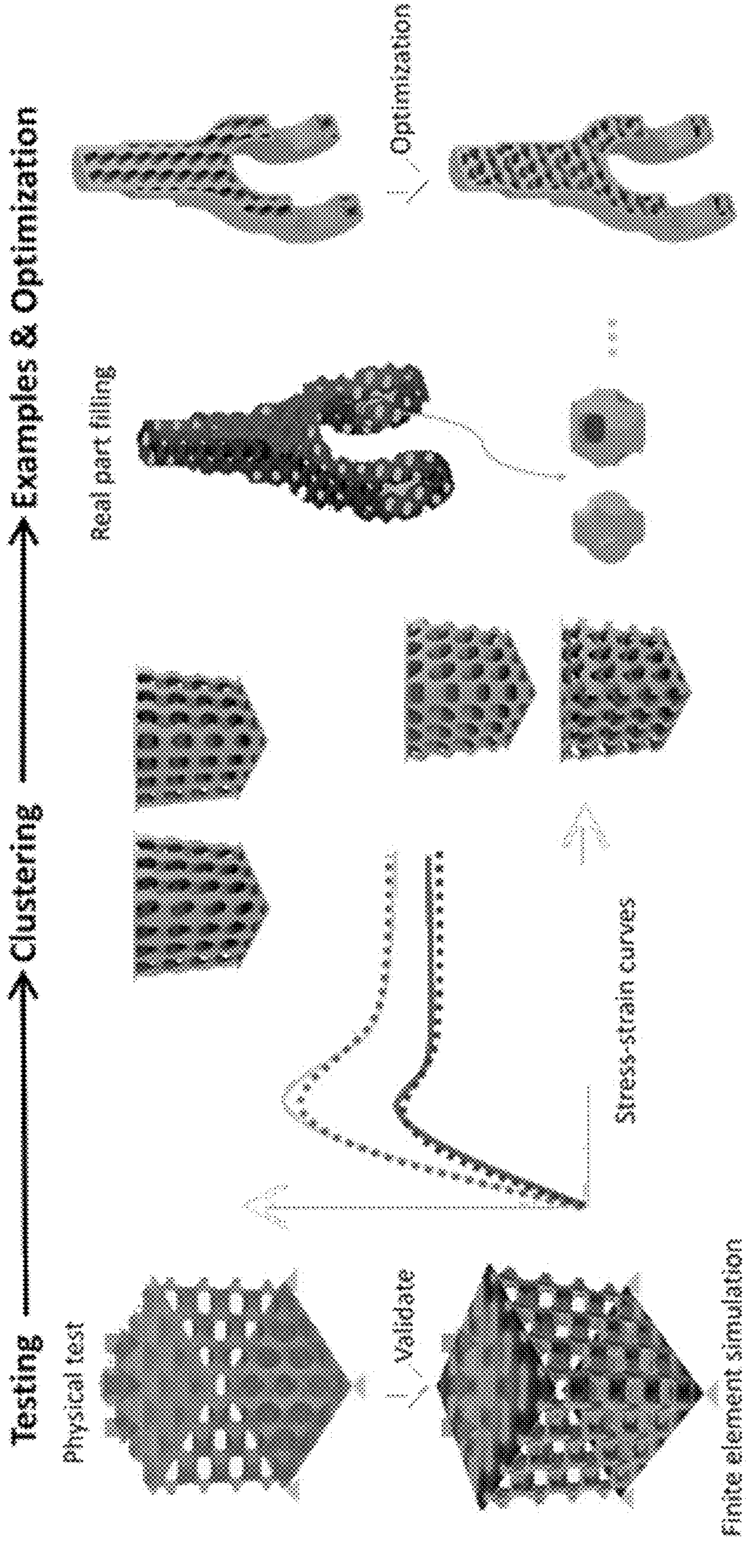

FIGS. 3A and 3B outline the flowchart showing the steps in the overall framework to optimize the lattified functional part. The periodic geometries can be determined and mathematically computed by the sum of selected sets of Fourier terms. This mathematical approach is chosen for the simplicity of geometry alteration and automated generation of various periodic structures using only a small set of Fourier terms. The periodic structures described by Fourier series have been proven to have exceptional optical, acoustical, and mechanical properties.

To quantitatively measure the shape similarity between different types of the underlying lattice cells, a robust rotation-based 3D shape descriptor is applied to represent each unit cell in the form of a probability distribution curve. Minkowski $L^N$ norm of the distribution curves can then be calculated to measure geometry similarity between the unit cells. The descriptor is applicable for describing the 3D unit cells since it is very robust for general models, such as meshes and solid models, and invariant to transform, such as rotation, translation and scaling.

To perform the compression test on the CPCSs, the unit cells are assembled and standardized to have the same dimension and volume as a cubic cellular lattice with two square caps at the top and bottom ends. The compression test yields the stress-strain curves that represent the compressive deformation behaviors of different CPCSs. Both physical test and FE simulation are performed to validate the results.

The utility of the overall developed framework is finally demonstrated on controlling the desired compressive behavior of CPCSs. By predefining the compressive loading and boundary conditions, three illustrative examples of functional parts are further formulated into three optimization problems. Given the internal space filling by CPCSs, a surrogate model-based optimization scheme is performed to optimize the filling orientations such that the overall concentrated stress levels of the three functional parts are minimized under particular loading and boundary conditions.

3. Methods

3.1 Geometry Computation

The first step for answering the research question is to create the geometric models of CPCSs that would be used later for further operations, such as measuring, fabricating, testing, and optimizing. In this section, the creation of the CPCSs is described in detail including the study of shape similarity comparison between different geometries of underlying unit cells.

3.1.1 Periodic Functions

Among the infinite possible analytical functions, Fourier series is powerful yet simple mathematical technique. It helps establish a scheme to systematically study CPCSs and allows representation of an arbitrary periodic function as a weighted sum of cosine and sine functions. By using this technique, each periodic function has an associated distinctive set of weighted coefficients (or Fourier coefficients) that univocally represent the periodic function. In particular, three-dimensional periodic functions defined within cubic unit cells are considered with side length a. The Fourier series expansion for these periodic functions is given as follows:

$$f(x, y, z) = +a_{000} + \sum_n \sum_m \sum_p \left\{ a_{nmp} \cos\left[\frac{2\pi}{a}(nx - my - pz)\right] + b_{nmp} \sin\left[\frac{2\pi}{a}(nx + my + pz)\right] \right\} \tag{1}$$

where n, m, and p are integer numbers, a is the length of the edge of the cubic unit cell, and $a_{000}$, $a_{nmp}$, and $b_{nmp}$ are the Fourier coefficients corresponding to three-dimensional periodic functions. The distance (or period) λ at which the cosine or sine functions in Equation 1 repeat in space is given by $\lambda = a/\sqrt{n^2+m^2+p^2}$. A parameter $d=n^2+m^2+p^2$ is defined to group cosine and sine functions with the same spatial period A. Considering that each cosine and sine function is equally relevant to the final expression of the periodic function, the periodic function may be simplified by assuming $a_{nmp}$ and $b_{nmp}$ have the same magnitude and choosing $|a_{nmp}|=|b_{nmp}|=1$, which does not alter the geometry of the periodic structure. A specific example is given by the formulas:

$$f_3^{4,I}(x, y, z) = \cos\left[\frac{2\pi}{a}(x+y+z)\right] + \cos\left[\frac{2\pi}{a}(x+y-z)\right] + \cos\left[\frac{2\pi}{a}(x-y+z)\right] + \cos\left[\frac{2\pi}{a}(x-y-z)\right] \tag{2}$$

$$f_3^{4,II}(x, y, z) = \cos\left[\frac{2\pi}{a}(x+y+z)\right] + \cos\left[\frac{2\pi}{a}(x+y-z)\right] + \cos\left[\frac{2\pi}{a}(x-y+z)\right] - \cos\left[\frac{2\pi}{a}(x-y-z)\right]$$

where: the subscript 3 denotes that the functions belong to the third group (d=3), the superscript 4 denotes that they include four trigonometric functions, and the Roman numerals I and II indicate that there exist two independent functions of all possible combinations. FIG. 21 show selected examples of periodic surface models that are generated using different periodic functions. More extra periodic functions can also be created by combining basic periodic functions corresponding to different d groups. For example, two basic periodic functions $$f_3^{4,I}(x, y, z) \text{ and } f_8^{6,I}(x, y, z)$$

may be combined from groups d=3 and d=8, respectively, and have $$f(x, y, z) = sf_3^{4,I}(x, y, z) + (1-s)f_8^{6,I}(x, y, z), \text{ where } 0 < s < 1.$$

In FIG. 21, the last model is shown by specifying s=0.6.

As is seen, we benefit from the Fourier series in creating the CPCSs for the following advantages: (1) a systematic and thorough description of periodic structures, (2) simplicity of geometry alteration and automated generation of a variety of periodic structures using a small set of Fourier terms, and (3) potential for generating very large number of models by simply combining basic functions and adjusting corresponding coefficients.

3.1.2 Shape Similarity

Figure 4B:
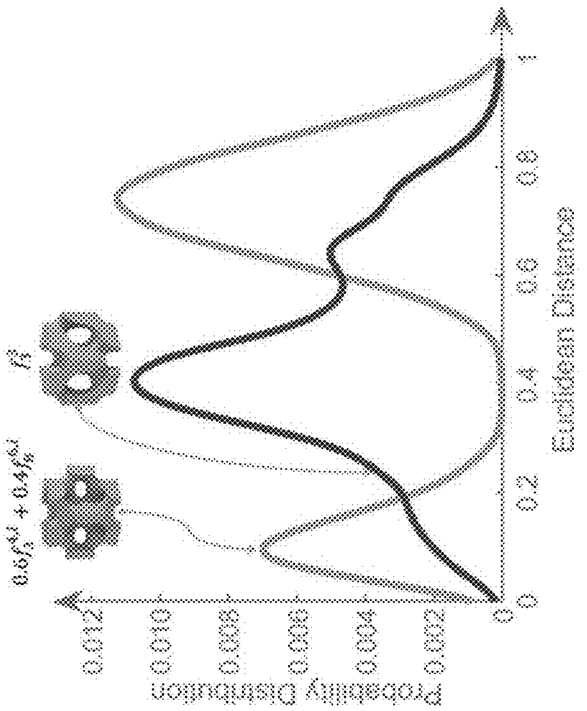
FIGS. 4A and 4B show the rotation-based 3D shape descriptor.
Figure 4A:
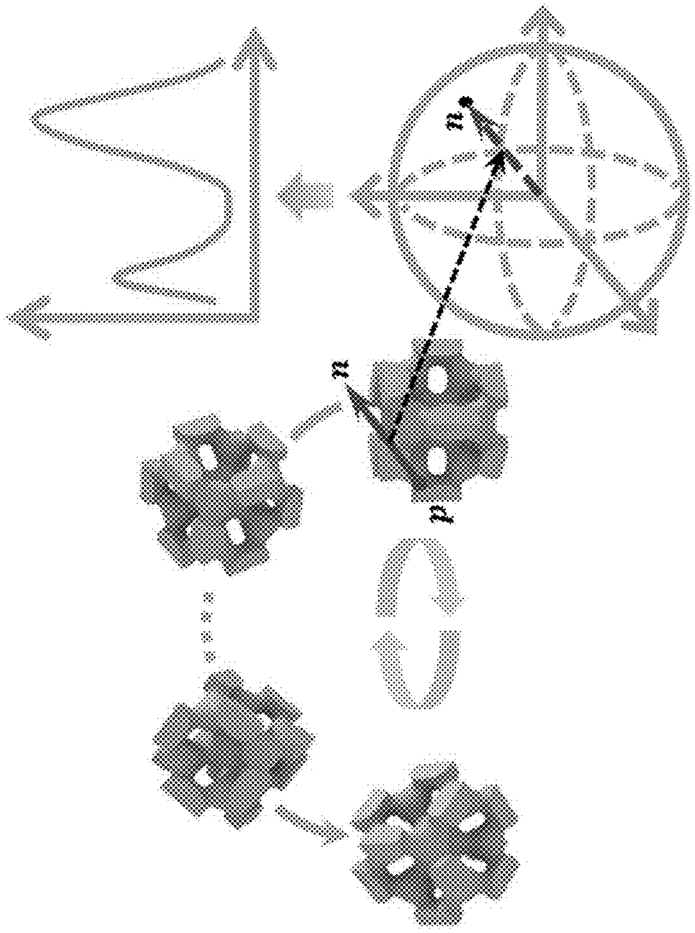

FIGS. 4A and 4B show the rotation-based 3D shape descriptor. FIG. 4A shows a diagram of Gaussian mapping used in computing the probability distribution curve of Euclidean distances. 80,000 sampling points, 4,000 rotations, and 8 sections for were used Gaussian sphere segmentation. FIG. 4B shows probability distribution curves of the examples of $$f_3^3 \text{ and } 0.6f_3^{4,I} + 0.4f_8^{6,I}.$$

Each curve is normalized to have a Euclidean distance range between [0,1] with 256 bins.

A rotation-based 3D shape descriptor may be applied such that the "seemingly different geometries" of unit cells can be quantified. The descriptor that takes advantage of Gaussian sphere has been depicted in FIG. 4A.

As FIG. 4A shows, regardless of the position of the point p on the object surface, its normal vector n can be always translated so that its origin coincides with the origin of the coordinate system, and the end of the unit normal lies on a unit sphere. The process is called Gaussian mapping, and the sphere is called Gaussian sphere. By uniformly sampling the object with N random points and randomly rotating the object for T times, we obtain T Gaussian spheres; each being distributed by N normal vectors. As shown in FIG. 4A, the Gaussian sphere is segmented into 8 sections by xy, yz, and xz planes. As a result, the N normal vectors in a Gaussian sphere can be segmented into 8 sections, thus forming a new 8-dimensional vector:

$$V = (v_1, v_2, v_3, v_4, v_5, v_6, v_7, v_8) \tag{3}$$

$$N = \sum_{i=1}^{8} v_i$$

where $v_i$ is the number of normal vectors in the ith section.

The probability distribution curve can be constructed by computing the Euclidean distance between any two of the T 8-dimensional vectors. Totally $$\frac{T(T-1)}{2}$$

distances are obtained. Each curve is normalized such that the Euclidean distance range is between [0,1] with 256 bins. In FIG. 4B, the curves of $$f_3^3 \text{ and } 0.6f_3^{4,I} + 0.4f_8^{6,I}$$

are computed, which can then be compared by applying $L^N$ Minkowski norm to show their shape similarity.

3.1.3 Standardization of Periodic Structure

Standardization of the periodic models is necessary (1) to encapsulate only relevant parameters of each unit cell underlying a given structure that can affect mechanical behaviors of the cellular solids and (2) to enable a fair comparison between different CPCSs. After the standardization, each type of cubic unit cell is mapped into the same dimension (1.00 inch×1.00 inch×1.05 inch (L×W×H)) and same volume (35% volume fraction of the inner region, see "Space—" in FIG. 5) with two square caps (1.00 inch×1.00 inch×0.025 inch (L×W×H)) at the top and bottom ends. An example of standardized CPCS is illustrated in FIG. 5. Since the same material is used for fabrication, each printed 3D solid has the same weight as well. Sharp corners are removed to avoid large stress concentration zones during the compression tests.

3.2 Testing

A standardized CPCS is then fabricated using 3D printing technique, and the physical compression test is performed on the 3D printed structure. FE simulated compression test would be the main approach we use to reveal the compressive deformation behaviors of various CPCSs.

3.2.1 Micro-Stereolithography Based Fabrication

To fabricate the CPCS model with high-resolution details, a bottom-up laser-based stereolithography (SLA) 3D printer is selected, Form 1+ from Formlabs, which achieves high accuracy and surface quality compared with other additive manufacturing (AM) processes. The print's mechanical performance is guaranteed by using a tough photopolymer resin, FLTOTL05, which is compatible with the Form 1+ system and recommended for geometrically accurate prototyping under load and high-stress components in various engineering applications.

3.2.2 Material Properties

Table 1 shows elastic properties of FLTOTL05 tough resin.

Table 1 lists the elastic properties of the tough resin obtained from a designed compression test. Relying on a cylindrical specimen, Young's Modulus and Poisson's Ratio are obtained by measuring the displacements in longitudinal direction and expansions in diameter directions using high-precision distance sensors (HMG-DVRT-1.5 and MG-DVRT-3 from MicroStrain). A United testing system is utilized to accomplish this task under a low loading condition with compressive speed of 0.00045 inch/second. Plastic stresses and strains of the tough resin need to be collected by applying much higher compressive loading using a more powerful testing system. An MTS hydraulic material testing system is used to deform the cylindrical specimen into the plastic behavior region with the same compressive speed of 0.00045 inch/second. Five cylindrical samples were 3D printed, and the final elastic and plastic properties are determined by averaging the behaviors of all the five samples. To validate the use of the experimentally obtained material properties in FE simulations, the same compression test was replicated in FE simulation using the averaged material properties and compare their resulting stress-strain curves (FIG. 6). In FIG. 6, the two experimental curves represent two extreme situations (lowest and highest stiffness) in the five cylindrical samples. The figure shows consistent curves (nearly 15% strain) between experimental and simulated results that support use of the material properties in the following simulations.

3.2.3 FE Simulated and Physical Compression Test

Given the considerable number of potential CPCSs, it is impractical to print every CPCS and get the compressive behavior using physical experiment. FE simulation, instead, can be a more practical and efficient way to study the compressive behaviors of various CPCSs. However, in order to validate the simulated results, we also randomly select one structure to do the physical compression test for a comparison. FIG. 7A shows a 3D printed CPCS specimen $$f_3^3.$$

FIG. 7B shows the 3D printed CPCS specimen $$f_3^3$$

FIG. 7A under axial compression. FIG. 7C shows stress-strain curves of $$f_3^3$$

in experimental (—) and simulated (----) compression tests. An approximate 15% strain is applied to $$f_3^3$$

in both physical experiment and FE simulation, and the two stress-strain curves demonstrate a consistent trend within the region.

FIG. 8 shows probability distribution curves for nine different types of unit cells, shown and labelled on the right portion of the figure. 80,000 sampling points, 4,000 rotations, and 8 sections were used for Gaussian sphere segmentation in the rotation-based 3D shape descriptor.

3.3 Clustering

Nine standardized CPCSs were generated by randomly selecting nine periodic functions from groups d=1, d=2, d=3, and a combined group of d=3 and d=8 (section 3.1.1). Before conducting the FE simulated compression tests, the unit cells of the nine CPCSs are described by the rotation-based 3D shape descriptor to compare the shape similarity of their geometries (section 3.1.2). FIG. 8 displays the probability distribution curves of the nine types of unit cells shown on the rights side and in FIG. 9A. The $L^2$ Minkowski norm (Euclidean) of the distribution curves is computed as the distance metric to measure geometry similarity between the nine unit cells. Table 2 lists a confusion matrix that shows the shape similarity measurement results of all the nine unit cells.

Table 2 shows shape similarity measurement results of nine types of CPCS unit cells.

The simulated stress-strain curves of the nine different CPCSs are described in FIG. 9B. Based on their compressive behaviors and shape similarities, the situations are classified into three scenarios:

1. Similar shapes and similar behaviors.

$$f_2^{3,II} \text{ and } f_2^{4,II}$$

behave almost the same and they also have a very good shape similarity with an $L^2$ norm value of 0.0108.

2. Dissimilar shapes but similar behaviors.

$$f_2^{3,II} \text{ and } f_2^{5,IV}$$

have shown similar behaviors, but their shapes are dissimilar with an $L^2$ norm value of 0.0525.

3. Similar shapes but dissimilar behaviors. Even $$f_2^{3,I} \text{ and } f_2^{5,II}$$

have the best shape similarity among the nine CPCSs with an $L^2$ norm value of 0.0092, they present a large discrepancy in their behaviors.

It is worth noting that the nine CPCSs can be further classified into two clusters based on the isotropy or orthotropy of the structure along x-axis, y-axis, and z-axis. Isotropic structures like $$f_1,\ f_3^3,\ f_3^{4,II},\ f_2^{3,II}, \text{ and },\ 0.6f_3^{4,I} + 0.4f_8^{6,I}$$

keep the same compressive properties along all three orthogonal axes, while orthotropic structure, such as $$f_2^{3,I},\ f_2^{4,II},\ f_2^{5,II}, \text{ and } f_2^{5,IV},$$

can have distinct behaviors in three axes. To simplify the issues, only study the compressive behaviors of the CPCSs in the direction along z-axis. Therefore, under the prescribed compressive loading and boundary configuration, the standardized CPCSs do result in similar mechanical behaviors with similar or dissimilar shapes in a specific direction. However, even with very similar shapes, sometimes the CPCSs can still show divergent behaviors. It seems the behavior of a CPCS can be very sensitive to even slight geometry variations at certain critical locations under specific loading and boundary conditions such as the discrepancies in the compressive behaviors between $$f_2^{3,I},\ f_2^{4,II}, \text{ and } f_2^{5,II}.$$

3.4 Examples and Optimization

To apply the CPCSs in practical applications, the functionally lattified parts are designed and optimized by filling the inside volumes of models with the CPCSs. FIGS. 10A-10C depict three illustrative examples (bracket, connecting rod, and fork end) with their modeling procedures. In some applications, not all interior volumes need to be hollowed and filled with internal structures. For example, non-uniform offsetting can be applied to locally shell the part with different user specified wall thicknesses at selected points and thus leaving critical portions solid (FIGS. 11A-11B). FIGS. 11A-11B show a lattified bracket with uniform offsetting and non-uniform offsetting. FIG. 11A shows uniform offsetting with a single wall thickness. FIG. 11B shows non-uniform offsetting with different thicknesses at different locations. The critical portions are solid.

3.4.1 Optimization Problem Formulation

The orientation of the internal structure is described by a vector of three angles $\Theta=[\theta_x,\theta_y,\theta_z]$ corresponding to rotations about the three coordinate axes. The default orientation is assumed to be a zero-valued vector $\Theta_0=[0,0,0]$. For any rotation, the rotations are performed on the whole internal structure (FIG. 13). Due to the non-commutative nature of the rotations, the rotations are carried out in a specified order—rotation about z-axis, followed by y-axis, and finally x-axis by using matrix multiplication, $R=R_x(\theta_x)R_y(\theta_y)R_z(\theta_z)$. The disclosed order is intended to be non-limiting, and other orders are possible. The homogeneous affine rotation matrices ($R_x(\theta_x)$, $R_y(\theta_y)$, and $R_z(\theta_z)$) about each of the axes are given as follows:

$$R_x(\theta_x) = \begin{bmatrix} 1 & 0 & 0 \\ 0 & \cos(\theta_x) & -\sin(\theta_x) \\ 0 & \sin(\theta_x) & \cos(\theta_x) \end{bmatrix} \tag{4}$$

$$R_y(\theta_y) = \begin{bmatrix} \cos(\theta_y) & 0 & \sin(\theta_y) \\ 0 & 1 & 0 \\ -\sin(\theta_x) & 0 & \cos(\theta_y) \end{bmatrix}$$

$$R_z(\theta_z) = \begin{bmatrix} \cos(\theta_z) & -\sin(\theta_z) & 0 \\ \sin(\theta_z) & \cos(\theta_z) & 0 \\ 0 & 0 & 1 \end{bmatrix}$$

The objective of the orientation optimization is to identify an optimum orientation that minimizes the maximum concentrated stress (MCS) $\sigma$ of the part under the defined compression loading condition. The design variables of the optimization problem are $\Theta=[\theta_x,\theta_y,\theta_z]$. The optimization problem can be stated as follows:

$$\begin{aligned} &\text{minimize } \sigma = \max(\Sigma) \\ &\text{subject to } -\frac{\pi}{k} \le \theta_x \le \frac{\pi}{k}, \\ &\qquad -\frac{\pi}{k} \le \theta_x \le \frac{\pi}{k}, \\ &\qquad -\frac{\pi}{k} \le \theta_x \le \frac{\pi}{k}, \end{aligned} \tag{5}$$

where $\Sigma$ denotes the von-Mises stresses all over the part. The maximum stress $\sigma$ is the optimization cost function which has been substituted by the FE simulation. The three examples used in the optimization problem correspond to three FE models. The three FE models are illustrated in FIGS. 13A-13C. The three angles are within the range between $$\left[-\frac{\pi}{k}, \frac{\pi}{k}\right],$$

k value depends on the isotropy or orthotropy of the structure along x-axis, y-axis, and z-axis. For isotropic structures, k=4 (e.g., $$f_1 \text{ and } f_3^3),$$

otherwise, k=2 (e.g., $$f_2^{3,I} \text{ and } f_2^{4,II}).$$

FIG. 12 shows a fork end structure per FIG. 10C for orientations of the internal structures: θ=[0,0,0]; θ=[π/4,0, 0], θ=[π/4,π/4, 0], and θ=[π/4,π/4,π/4].

FIGS. 13A-13C show finite element models for optimization. FIGS. 13A-13B show loading and boundary conditions of bracket (left) and a simulated contour of von-Mises stress (right). FIGS. 13C-13D show loading and boundary conditions of connecting rod (left) and a simulated contour of von-Mises stress (right). FIGS. 13D-13E show loading and boundary conditions of fork end (left) and a simulated contour of von-Mises stress (right). Three (▲) in different directions symbolize a fixed boundary condition along all three coordinates. White arrows (→) points out a pressure loading condition and the direction it is applied in. The shell thickness of the three parts is all set to 0.08 in.

3.4.2 Surrogate Model Based Global Optimization Scheme

The cost function computation, which involves FE simulation of the target object, is highly computationally expensive. The stress acquisition in cost function evaluation include rotating operation, geometric modeling, mesh generation, FE simulation, and target value extraction. Moreover, the computational complexity escalates with intricate geometries of the CPCSs. Therefore, a surrogate model-based optimization approach was adopted, wherein the cost function is considered as a black box problem characterized by only its input and output. How surrogate model-based optimization works is illustrated in FIGS. 14A-14E. The x-axis represents the design variable and the cost function is plotted on the y-axis. The flowchart of the specific simulation-based optimization problem using a surrogate model is depicted in FIG. 15.

FIGS. 14A-14E show a one-dimensional example of surrogate model-based optimization. FIG. 14A shows an objective cost function (- - -) and initial design space (▲). FIG. 14B shows a surrogate model (—) mapped to initial design space. FIG. 14C shows new sample points (■) generated in the next iteration. FIG. 14D shows a surrogate model updated based on information from new sample points. FIG. 14E shows that, after iteratively updating and achieving convergence, an optimum solution (●) obtained.

MATLAB's surrogate modeling toolbox (MAT-SuMoTo) was employed. MATSuMoTo provides flexibility to choose from various types of surrogate models, initial design space generation methods, and new sample points generation methods. The basic outline of MATSuMoTo optimization process is described below.

Initial design space: The method starts by creating an initial design space, which in our case is an initial set of orientations, using the chosen design of experiment (DOE) scheme. Although the user has the flexibility to adjust the size of the design space, the minimum size depends on the desired surrogate model. MATSuMoTo toolbox provides three DOE strategies, namely Latin hypercube design (LHS), symmetric Latin hypercube design, and corner points design. The Latin hypercube design strategy was used to evenly distribute the initial design space over the entire domain of design variables. Once the design space of orientations is generated, the maximum stress of the part under predefined loading condition is evaluated for these orientations.

Surrogate model: Next, a surrogate model is mapped on the initial design space data to create an analytical function mapping the design variables to the cost function values. The choice of the surrogate model is application specific and is based on methods such as radial basis functions (RBF) models, Kriging models, and polynomial regression and multivariate adaptive regression models. MAT-SuMoTo toolbox offers fifteen different types of surrogate models, which are designed using one or more of the above-mentioned methods. The cubic RBF model surrogate model was selected for use, because the cubic RBF model does not require shape factor tuning and hence provides fast computation. It also delivers high performance and robustness for small sample sizes.

Selection of new samples: In this step, a new set of sample orientations are generated, and the target values are evaluated at the newly generated orientations. The surrogate model is progressively improved using the new data samples. The desired number of sample points to be selected in each iteration is selected by a user, though termination conditions may also be adaptively defined. MAT-SuMoTo toolbox provides three different approaches for new sample point generation, namely CANDloc, CANDglob, and Surrogate model minima. Due to the effectiveness of CANDglob method in avoiding local minima, it is used to generate one new sample point at each iteration. In this method, few candidate points are generated by small perturbations of the current minima of the surrogate model and the remaining by uniformly sampling points from the whole domain.

Iterations and termination: The method compares the cost function values of the new sample points and assess the stopping criteria. The method iterates through the process and progressively improves the surrogate model until the stopping criteria are satisfied. Either one of them has to be satisfied to terminate the program. The first stopping criterion is satisfied if the improvement in the optimal cost function is less than $10^{-4}$ for 10 consecutive iterations. The second stopping criterion is satisfied when the total number of function evaluations including the initial design space exceeds a pre-set limit L. In the case studies presented herein, the limit L is set to between 300~600. The initial design space size is chosen to be L/6 for all the three cases.

4. Numerical Illustration

The performance of the three functional parts are affected by altering the filling orientation of the CPCSs or changing the geometry of each unit cell. To find the best filling orientation, the optimization problem formulated in Equation 5 is solved using the surrogate model based global optimization scheme. The best filling orientation minimizes the concentrated stresses over the entire object. After identifying the best orientation, the FE simulation is repeated by solely replacing the geometry of each unit cell to see the influence of the underlying geometry of each unit cell. Functional parts modeled by non-uniform offsetting are also optimized to compare with the optimization results of the uniformly offset parts.

4.1 Filling Orientation Optimization

To demonstrate the concept of filling orientation optimization, three FE models are generated as seen in FIGS. 13A-13C, while keeping changing the filling orientations.

The three models, bracket (FIG. 13A), connecting rod (FIG. 13B), and fork end (FIG. 13C) are filled with internal structures $$f_1, f_3^3, \text{ and } f_2^{3,I},$$

respectively. Following the surrogate model-based optimization scheme, the parameters of the surrogate model are given in Table 3 for each example. The discrepancies between examples in evaluation number, initial design space size, and the lower and upper bounds are due to the isotropy or orthotropy of the CPCSs.

Table 3 shows parameters of the surrogate model.

FIG. 16 illustrates a graph of the performance of the surrogate model-based optimization approach as a function of evaluation points for the connecting rod problem shown in FIG. 14B. It can be seen that the best objective value is reached after 194 objective evaluations (i.e., FE simulations). Only a new lower cost will be recorded in the plotting method.

FIGS. 17A-17F show optimization results of the filling orientation. FIGS. 17A-17B show FEA results of bracket with original and optimum filling orientations of internal structure $f_1$. FIGS. 17C-17D show FEA results of connecting rod with original and optimum filling orientations of internal structure $$f_3^3.$$

FIGS. 17E-17F show FEA results of fork end with original and optimum filling orientations of internal structure $$f_2^{3,I}.$$

The optimum filling orientations effectively remove the concentrated stresses of the three examples under the same loading and boundary conditions.

The optimized structures are shown in FIGS. 17A-17F compared to the initial structures. Relying on the FE simulated contour color maps, the large concentrated stresses are removed effectively in all three cases after our optimization approach is applied. Table 4 shows the mitigation in MCS for the three problem configurations. Depending on the geometry, initial filling orientation, loading and boundary conditions, up to a 70% improvement in the MCS value is achieved.

Table 4 shows numerical results for three examples.

Table 5 shows the computational performance of the approach for the three problems with different modeling, meshing, and simulation complexities. Due to the simulation-based optimization method, each objective function evaluation process includes four steps (FIG. 15): (1) geometry modeling, (2) mesh generation, (3) FE simulation, and (4) target value extraction. Each step in the evaluation process contributes to the computational costs. Specially, mesh generation and FE simulation constitute the computational bottleneck. The quantity and quality of the mesh elements directly impact the overall computation time. In these problems, the volumetric mesh has all-tetrahedral elements. All the all-tetrahedral meshes are optimized before FE simulation by removing the zero-volume and sliver elements. It is because the fork end has more complicated geometry which requires longer time to remove the bad elements in the mesh generation step. A PC with a 3.4 GHz Intel Core i5-7500 CPU and 8 GB RAM using MATLAB R2016a is used for the surrogate model-based optimization, which drives the geometry modeling, mesh generation, FE simulation, and target value extraction. The FE simulations are accomplished by python script based ABAQUS.

Table 5 shows computational performance of our method for three examples.

4.2 Comparison to the Solid Parts

Optimizing functional parts by lattifying the inside with complex internal structures, the most important advantage is to make the parts light-weight but still maintain structural integrity and strength. To demonstrate that the optimized parts can have similar or even better performances, the simulation results are compared between the optimized lattified parts and their original solid ones using the same loading and boundary conditions.

FIGS. 18A-18F show a performance comparison between optimized lattified parts and solid parts. FIGS. 18A-18B show FEA results of bracket with optimum filling orientations of internal structure $f_1$ and solid bracket. FIGS. 18C-18D show FEA results of connecting rod with optimum filling orientations of internal structure $$f_3^3$$

and solid connecting rod. FIGS. 18E-18F show FEA results of fork end with optimum filling orientations of internal structure $$f_2^{3,I}$$

and solid fork end. The FE simulation contours have been given in FIGS. 18A-18F for a visualization of the performance comparison between the three optimized examples and their original solid ones. Table 6 exhibits the relevant numerical results of the performance comparison.

Table 6 shows numerical illustration of the performance comparison between optimized lattified parts and solid parts.

It is very interesting to notice that the comparison of the three problem configurations respectively reveals three different scenes after the optimization:

1. The optimized lattified part achieves similar performance, and the weight is effectively reduced. The optimized bracket has a MCS value of 427.466 psi which is close to the MCS value (379.970 psi) of the solid part. However, the weight is dramatically reduced for 41.59% (FIGS. 18A-18B in Table 6).
2. The optimized lattified part does not perform as well as the solid part though the weight is reduced. The MCS value of connecting rod can only be minimized to 460.248 psi by the current optimization configurations, while the solid part offers a much lower MCS value of 320.518 psi. While reducing its weight, the part sacrifices its performance (FIG. 18C-18D in Table 6).
3. The optimized lattified part outperforms the solid part, while the weight is reduced. Fork end demonstrates the best situation in which the MCS is optimized to a value of 224.779 psi that is even much lower than the MCS value (464.523 psi) of the solid part and the weight is reduced for 41.37% simultaneously (FIGS. 18E-18F in Table 6).

4.3 Optimization of Non-Uniformly Offset Part

The performance comparison with solid parts indicates that there exist some critical portions on the parts which should not be lattified under certain loading and boundary configurations. By filling the inside with the best orientation, the very critical portions can still have some residual concentrated stresses (FIG. 18A and FIG. 18C. To better optimize such parts, the parts are non-uniformly offset to guarantee the critical portions have enough thickness and strength (FIG. 12) under the same loading and boundary conditions. It is worthwhile to compare the performances between solid parts and the optimized non-uniformly offset parts as well (FIGS. 19A-19C, 20A-20C). Table 7 compares the numerical results of the performance between optimized uniformly offset, optimized non-uniformly offset, and solid parts.

Table 7 shows a numerical illustration of the performance comparison between optimized uniformly offset, optimized non-uniformly offset, and solid parts.

By applying non-uniform offsetting to bracket and connecting rod, their critical portions are lightly thickened for 0.08 in and 0.1 in and the same optimization process repeated. Table 7 shows that bracket and connecting rod are further reinforced with lower MCS values of 369.188 psi and 360.006 psi. However, as a consequence of non-uniform offsetting, the weight reduction decreases to 28.00% and 22.90%.

4.4 Influence of Underlying Geometry

Experiments were performed fixing the filling orientation while changing the type of unit cells employed to check the influence of underlying geometry in the performance of functional parts. To make a fair comparison, the same volume fraction (35%) for each type of unit cell is maintained so that the lattified part has approximately the same volume after each lattifying. Table 8 exhibits the MCS values of bracket with different types of unit cells (FIG. 9A) filled inside under the same prescribed loading and boundary conditions. The filling orientation is kept the same as [−45°, −45°, 6.5365° ], which is the optimum filling orientation for unit cell $f_1$ with a volume fraction of 35%.

Table 8 shows a numerical illustration of the influence of underlying geometry.

The comparison in Table 8 indicates the underlying geometry does have a significant impact on the performance of part, though the filling orientation and volume are kept the same. In addition, the optimum filling orientation is unique for specific type of unit cell. In Table 9, unit cell type $f_1$ still performs the best with filling orientation [−45°, −45°, 6.5365°], while the other unit cell types all create larger MCS values.

Under the compressive loading and boundary conditions in a real bracket, the three scenarios happened in the compression tests of standardized CPCSs still exist. There is no clear relationship of similarities between geometry and behavior. As shown in Table 8, similar geometries could have similar performances such as $$f_2^{3,I} \text{ and } f_2^{4,II}$$

(586.384 psi and 586.782 psi of MCS), however, the dissimilar geometries $$f_2^{5,II} \text{ and } 0.6f_3^{4,I} + 0.4f_8^{6,I}$$

(473.226 psi and 475.230 psi) also show very similar performances under the prescribed loading and boundary conditions. Some similar geometries, such as $$f_2^{3,I} \text{ and } f_2^{5,II},$$

even present a relatively large discrepancy (586.384 psi compared to 515.826 psi) in their performances. There is only one thing new that with the different loading and boundary conditions and performance criteria, it could be another two dissimilar geometries to have the similar performances.

5. Conclusion

Cubic periodic cellular structures (CPCS) are comprehensively investigated at macro scale. A strategy for the compressive behavior evaluation of standardized CPCSs is provided, as well as a scheme for simulation-based design and optimization of CPCSs in applications of real functional parts. An efficient optimization loop is also created to design the high-performance lattified functional parts with best oriented CPCSs filled internally.

It is shown that the problems presented may be effectively simplified by focusing on only the compressive behavior and limiting the design variables to the selection of the CPCS cell and filling orientation rotations in the optimization problem formulation.

To create the CPCSs for compression tests and the following operations, an implicit function-based modeling technique was employed that allows for very easy manipulations on the CPCSs, such as unit cell changing, offsetting, blending, shape deformation and orientation alteration, taking advantage of a complete parameterization of the CPCS models. Fourier series is selected to be the implicit function because it is a simple yet powerful mathematical technique that can be used to systematically study CPCSs.

The CPCSs used for compression tests are standardized in advance to enable a fair comparison between CPCSs with unit cell shape as the only variable. The standardized CPCSs all have the same dimensions and volume (e.g., FIG. 5). A rotation-based 3D shape descriptor is used to digitalize the different geometries of unit cells by generating probability distribution curves. The shape similarity of different types of unit cells can then be compared by computing the $L^2$ Minkowski norm between different distribution curves. FE simulation is the main approach we use to conduct the compression test owing to the very time-consuming processes in fabrication and physical tests.

To obtain the proper material properties needed in FE simulation, material tests were performed on five 3D printed cylindrical specimens that are made of tough resin. Nine standardized CPCSs were created from different groups of Fourier series functions to do the compression tests. Though the number is limited, their compressive behaviors are still able to reveal three potential scenarios that reflect the actual relationship between similarities of geometries and behaviors: (1) similar shapes result in similar behaviors $$(f_2^{3,I} \text{ and } f_2^{4,II}),$$

(2) dissimilar shapes result in similar behaviors $$(f_2^{3,I} \text{ and } f_2^{5,IV}),$$

and (3) similar shapes result in dissimilar behaviors $$(f_2^{3,I} \text{ and } f_2^{5,II}).$$

The variation of behaviors also depend on specific loading and boundary conditions.

CPCSs are also capable of being adopted in more practical applications. Lattifying the solid functional parts by filling the inside with CPCSs, the functional parts can maintain or outperform the original structural integrity and strength with much lower weight under certain loading and boundary configurations. To identify the best filling orientations of different types of CPCSs for an optimum performance of the functional parts, a surrogate model-based global optimization scheme is provided to find the enhanced designs. A number of non-limiting examples are presented using three different functional parts (bracket, connecting rod, and fork end) with CPCSs $$f_1, f_3^3 \text{ and } f_2^{3,I}$$

filled inside, respectively.

To demonstrate the capability of the presently-disclosed scheme, the optimization scheme is employed to minimize the maximum concentrated stresses (MCS) of the three functional parts under predefined compressive loading and boundary conditions. The optimum MCS is compared to the initial MCS to measure the optimization capability. Bracket and connecting rod achieve an improvement of 32.40% and 35.55% in 300 evaluations, while fork end is dramatically improved about 70% in 600 evaluations. With a fixed CPCS volume fraction of 35%, the weights of the three parts are reduced by 41.59%, 37.57%, and 41.37%, respectively, compared to the solid ones. Given the effective weight saving, bracket can approximately maintain its original performance (427.466 psi and 379.970 psi) and fork end even outperforms the solid one (224.779 psi and 464.523 psi) with their optimum filling orientations. However, when losing its weight, connecting rod also loses its performance (460.248 psi and 320.518 psi). Therefore, non-uniform offsetting is applied to the shell bracket and connecting rod so that the critical regions on the parts can be specifically thickened. After the non-uniform offsetting, the MCS values of bracket and connecting rod are further improved to 369.188 psi and 366.006 psi. Obviously, by non-uniform offsetting, the weight reduction becomes less.

In this optimization scheme, the target value is evaluated by FE simulation as an alternate to a mathematical objective function. The surrogate model keeps updating itself by running the simulations in a loop until the stopping criteria are satisfied. As a result, except for the optimization efficacy, the computational efficiency of the scheme is regarded as an important consideration due to the very time-consuming mesh generation and FE simulation processes (FIG. 15).

To realize the optimization at a feasible time cost, a large number of numeric experiments may be run, to find a balance between mesh quality and mesh processing speed. The present scheme has shown a decent computational performance in optimizing the three parts. The bracket takes 18.68 hours to finish the optimization in 300 evaluations with an average of 350,210 mesh elements, and connecting rod takes 19.00 hours to run 300 evaluations with an average of 355,612 mesh elements. The fork end takes longer time to generate the quality mesh and run the simulation, thus needs an average of 445.8 seconds to finish one evaluation compared to 224.2 seconds and 228.1 seconds of bracket and connecting rod.

Finally, the filling orientation is fixed, and the underlying unit cells subject to experimental variation to compare the performances of bracket. It is interesting to notice that the three scenarios happened in the compression tests of standardized CPCSs still exist. However, with different problem setups and performance criteria, dissimilar geometries may have quite similar performances.

Although the present disclosure has been described with respect to one or more particular embodiments, it will be understood that other embodiments of the present disclosure may be made without departing from the spirit and scope of the present disclosure. The present disclosure describes non-limiting selections, however, other alternatives, combinations, subcombinations and permutations of the various features disclosed herein may be used.

TABLE 1

Elastic properties of FLTOTL05 tough resin

| Material | Young's Modulus (E, psi) | Poisson's Raio (v) |
|---|---|---|
| FLTOTL05 | 104820 | 0.45 |

TABLE 2

Shape similarity measurement results of nine types of CPCS unit cells

| | $f_1$ | $f_2^{3,I}$ | $f_2^{3,II}$ | $f_2^{4,II}$ | $f_2^{5,II}$ | $f_2^{5,IV}$ | $f_3^3$ | $f_3^{4,II}$ | $0.6f_3^{4,I} + 0.4f_8^{6,I}$ |
|---|---|---|---|---|---|---|---|---|---|
| $f_1$ | 0 | 0.0288 | 0.0522 | 0.0360 | 0.0228 | 0.0435 | 0.0203 | 0.1154 | 0.0969 |
| $f_2^{3,I}$ | 0.0288 | 0 | 0.0473 | 0.0108 | 0.0092 | 0.0212 | 0.0161 | 0.0984 | 0.0772 |

TABLE 2-continued

Shape similarity measurement results of nine types of CPCS unit cells

| | $f_1$ | $f_2^{3,I}$ | $f_2^{3,II}$ | $f_2^{4,II}$ | $f_2^{5,II}$ | $f_2^{5,IV}$ | $f_3^{3}$ | $f_3^{4,II}$ | $0.6f_3^{4,I}+0.4f_8^{6,I}$ |
|---|---|---|---|---|---|---|---|---|---|
| $f_2^{3,II}$ | 0.0522 | 0.0473 | 0 | 0.0471 | 0.0486 | 0.0525 | 0.0476 | 0.1011 | 0.0851 |
| $f_2^{4,II}$ | 0.0360 | 0.0108 | 0.0471 | 0 | 0.0128 | 0.0138 | 0.0263 | 0.1013 | 0.0763 |
| $f_2^{5,II}$ | 0.0228 | 0.0092 | 0.0486 | 0.0128 | 0 | 0.0275 | 0.0145 | 0.1048 | 0.0847 |
| $f_2^{5,IV}$ | 0.0435 | 0.0212 | 0.0525 | 0.0138 | 0.0275 | 0 | 0.0323 | 0.1030 | 0.0760 |
| $f_3^{3}$ | 0.0203 | 0.0161 | 0.0476 | 0.0263 | 0.0145 | 0.0323 | 0 | 0.1013 | 0.0822 |
| $f_3^{4,II}$ | 0.1154 | 0.0984 | 0.1011 | 0.1013 | 0.1048 | 0.1030 | 0.1013 | 0 | 0.0476 |
| $0.6f_3^{4,I}+0.4f_8^{6,I}$ | 0.0969 | 0.0772 | 0.0851 | 0.0763 | 0.0847 | 0.0760 | 0.0822 | 0.0476 | 0 |

TABLE 3

| Problem setup | Evaluation number | Surrogate model | Sampling Strategy | Initial design | Initial design space size | Lower bound | Upper bound |
|---|---|---|---|---|---|---|---|
| Bracket FIG. 13A | 300 | RBFcub | CANDglob | LHS | 50 | $\left[-\frac{\pi}{4}, -\frac{\pi}{4}, -\frac{\pi}{4}\right]$ | $\left[\frac{\pi}{4}, \frac{\pi}{4}, \frac{\pi}{4}\right]$ |
| Connecting Rod FIG. 13B | 300 | RBFcub | CANDglob | LHS | 50 | $\left[-\frac{\pi}{4}, -\frac{\pi}{4}, -\frac{\pi}{4}\right]$ | $\left[\frac{\pi}{4}, \frac{\pi}{4}, \frac{\pi}{4}\right]$ |
| Fork End FIG. 13C | 600 | RBFcub | CANDglob | LHS | 100 | $\left[-\frac{\pi}{2}, -\frac{\pi}{2}, -\frac{\pi}{2}\right]$ | $\left[\frac{\pi}{2}, \frac{\pi}{2}, \frac{\pi}{2}\right]$ |

TABLE 4

| Problem setup | Optimum orientation (unit: degree) | Initial MCS (unit: psi) | Optimum MCS (unit: psi) | % Improvement |
|---|---|---|---|---|
| Bracket FIG. 13A | [−45°, −45°, 6.5365°] | 632.346 | 427.466 | 32.40 |
| Connecting Rod FIG. 13B | [39.6360°, −7.3254°, −33.6042°] | 714.141 | 460.248 | 35.55 |
| Fork End FIG. 13C | [89.6879°, −12.5170°, 41.0730°] | 732.482 | 224.779 | 69.31 |

TABLE 5

Computational performance of method for three examples

| Problem setup | Average number of FEA elements | Total computation time (unit: second) | Average time for one evaluation (unit: second) |
|---|---|---|---|
| Bracket FIG. 13A | 350,210 | 67,255 (300 evaluations) | 224.2 |
| Connecting Rod FIG. 13B | 355,612 | 69,425 (300 evaluations) | 228.1 |
| Fork End FIG. 13C | 375,710 | 267,475 (600 evaluations) | 445.8 |

TABLE 6

Numerical illustration of the performance comparison between optimized lattified parts and solid parts

| | MCS (unit: psi) | | % Weight |
|---|---|---|---|
| Problem setup | Optimized | Solid | reduction |
| Bracket FIGS. 18A-18B | 427.466 | 379.970 | 41.59 |
| Connecting Rod FIGS. 18C-18D | 460.248 | 350.518 | 37.57 |
| Fork End FIGS. 18E-18F | 224.779 | 464.523 | 41.37 |

TABLE 7

Numerical illustration of the performance comparison between optimized uniformly offset, optimized non-uniformly offset, and solid parts

| | MCS (unit: psi) | | | % Weight |
|---|---|---|---|---|
| Problem setup | Optimized uniform offsetting | Optimized non-uniform offsetting | Solid | reduction (non-uniform offsetting) |
| Bracket FIGS. 19A-19C | 427.466 | 369.188 | 379.970 | 28.00 |
| Connecting Rod FIGS. 20A-20C | 460.248 | 366.006 | 320.518 | 22.90 |

TABLE 8

| Numerical illustration of the influence of underlying geometry | | |
|---|---|---|
| | Volume (unit: $in^3$) | MCS (unit: psi) |
| $f_1$ | 4.736 | 427.466 |
| $f_2^{3,I}$ | 4.734 | 586.384 |
| $f_2^{3,II}$ | 4.735 | 560.166 |
| $f_2^{5,II}$ | 4.736 | 586.782 |
| $f_2^{4,II}$ | 4.734 | 473.226 |
| $f_2^{5,IV}$ | 4.736 | 540.705 |
| $f_3^{3}$ | 4.732 | 521.699 |
| $f_3^{4,II}$ | 4.736 | 515.826 |
| $0.6f_3^{4,I} + 0.4f_8^{6,I}$ | 4.736 | 475.230 |

What is claimed is:

1. A method of optimizing a functional structure, comprising:

defining a boundary conditions for the functional structure;

defining loading conditions for the functional structure;

defining a periodic cell structure; and optimizing, with at least one automated processor, a spatial orientation of the defined periodic cell structure within the functional structure, according to a computer-implemented finite element model-based optimization, using a predictive finite element model with respect to load response of a standardized lattice, according to at least one criterion of the functional structure lattified with the defined periodic cell structure under the boundary conditions and loading conditions, wherein the predictive finite element model is a surrogate model derived from measurements of physical load response of a standardized lattice.

2. The method according to claim 1, further comprising optimizing, with the at least one automated processor, a spatial orientation of a plurality of different periodic cell structures within the functional structure, according to a respective computer-implemented finite element model, using a respective surrogate model for each respective different periodic cell structure.

3. The method according to claim 1, further comprising comparing the optimized spatial orientation of the defined periodic cell structure within the functional structure for at least two different defined periodic cell structures.

4. The method according to claim 1, wherein the loading conditions comprise a compression load.

5. The method according to claim 1, wherein the optimizing comprises performing a plurality of finite element analyses within design space for a spatial orientation with a best functional performance which meets a predetermined cost criterion.

6. The method according to claim 1, further comprising assessing a manufacturability of at least one functional structure lattified with the defined periodic cell structure.

7. The method according to claim 1, further comprising manufacturing the functional structure.

8. The method according to claim 1, further comprising additively manufacturing the functional structure, with the optimized spatial orientation of the defined periodic cell structure lattified within the functional structure.

9. A method of optimizing a functional structure, comprising:

defining a boundary conditions for the functional structure;

defining loading conditions for the functional structure;

defining a periodic cell structure; and optimizing, with at least one automated processor, a spatial orientation of the defined periodic cell structure within the functional structure, according to a computer-implemented finite element model-based optimization, using a predictive finite element model with respect to load response of a standardized lattice, according to at least one criterion of the functional structure lattified with the defined periodic cell structure under the boundary conditions and loading conditions, wherein the predictive finite element model is a surrogate model derived from measurements of physical load response of a standardized lattice; and wherein the predictive finite element model is parameterized based on a shape similarity of the defined periodic cell structure to properties of alternate periodic cell structures, the shape similarity being determined according to a periodic function analysis of a respective periodic cell structure lattice according to a rotation-based 3D shape probability distribution.

* * * * *